United States Patent
Hayton et al.

(10) Patent No.: US 7,346,842 B1
(45) Date of Patent: Mar. 18, 2008

(54) METHODS AND APPARATUS FOR INCORPORATING A PARTIAL PAGE ON A CLIENT

(75) Inventors: Richard Hayton, Cambridge (GB); David Halls, Cambridge (GB)

(73) Assignee: Citrix Systems, Inc., Fort Lauderdale, FL (US)

(*) Notice: Subject to any disclaimer, the term of this patent is extended or adjusted under 35 U.S.C. 154(b) by 1366 days.

(21) Appl. No.: 09/704,896

(22) Filed: Nov. 2, 2000

(51) Int. Cl.
*G06F 15/00* (2006.01)

(52) U.S. Cl. ............... 715/513; 715/530; 715/700; 705/64

(58) Field of Classification Search ......... 715/523, 715/500.1, 500, 511, 513, 516; 345/751, 345/419, 735, 771; 707/10, 104.1; 704/9; 709/217; 434/350
See application file for complete search history.

(56) References Cited

U.S. PATENT DOCUMENTS

| | | |
|---|---|---|
| 5,057,996 A | 10/1991 | Cutler et al. |
| 5,129,084 A | 7/1992 | Kelly, Jr. et al. |
| 5,142,679 A | 8/1992 | Owaki et al. |
| 5,291,587 A | 3/1994 | Kodosky et al. |
| 5,297,279 A | 3/1994 | Bannon et al. |

(Continued)

FOREIGN PATENT DOCUMENTS

AU  A-53031/98  8/1998

(Continued)

OTHER PUBLICATIONS

Mitchell, David C. "Leveraging Your Visual C++, Experience on the Internet with Thin Client Technology." [retrieved on Jul. 26, 1999] retrieved from the Internet: <URL: http://www.microsoft.com<. pp. 1-16.

(Continued)

*Primary Examiner*—Doug Hutton
*Assistant Examiner*—Quoc A. Tran
(74) *Attorney, Agent, or Firm*—Choate, Hall & Stewart, LLP

(57) ABSTRACT

The invention relates to a method and apparatus for regenerating portions of the page that have changed and transmitting only those portions to the client for display. Executing only the necessary parts of the page generation code and transmitting only changes to the client improves the efficiency of using the resources of the network communication channel, the client node and the server node. Performing these operations only when required, when the data has changed, improves the efficiency of use even further. The invention also takes advantage of any portions of the page that are already on the client by reusing them and thus eliminates the need to regenerate or transmit those reusable portions.

In one aspect, the invention relates to a method for incorporating a partial page into a transmitted page displayed on a client. The method includes displaying the transmitted page on a client, receiving by the client a regenerated portion of the transmitted page from a server and incorporating by the client the regenerated portion into the transmitted page displayed on the client. In one embodiment, the method includes receiving by the client a modification list from the server instructing the client on the incorporation of the regenerated page portion into the transmitted page. In another embodiment, the method includes receiving by the client additional code instructing the client on how to interpret commands contained in the modification list.

15 Claims, 16 Drawing Sheets

U.S. PATENT DOCUMENTS

| | | | |
|---|---|---|---|
| 5,297,283 A | 3/1994 | Kelly, Jr. et al. | |
| 5,321,841 A | 6/1994 | East et al. | |
| 5,325,533 A | 6/1994 | McInerney et al. | |
| 5,327,562 A | 7/1994 | Adcock | |
| 5,339,430 A | 8/1994 | Lundin et al. | |
| 5,341,477 A | 8/1994 | Pitkin et al. | |
| 5,341,478 A | 8/1994 | Travis, Jr. et al. | |
| 5,367,633 A | 11/1994 | Matheny et al. | |
| 5,369,766 A | 11/1994 | Nakano et al. | |
| 5,371,891 A | 12/1994 | Gray et al. | |
| 5,386,558 A | 1/1995 | Maudlin et al. | |
| 5,418,964 A | 5/1995 | Conner et al. | |
| 5,423,041 A | 6/1995 | Burke et al. | |
| 5,437,025 A | 7/1995 | Bale et al. | |
| 5,485,617 A | 1/1996 | Stutz et al. | |
| 5,499,343 A | 3/1996 | Pettus | |
| 5,511,197 A | 4/1996 | Hill et al. | |
| 5,515,536 A | 5/1996 | Corbett et al. | |
| 5,517,617 A | 5/1996 | Sathaye et al. | |
| 5,519,867 A | 5/1996 | Moeller et al. | |
| 5,530,852 A | 6/1996 | Meske, Jr. et al. | 395/600 |
| 5,537,546 A | 7/1996 | Sauter | 395/200.01 |
| 5,548,723 A | 8/1996 | Pettus | |
| 5,548,726 A | 8/1996 | Pettus | |
| 5,566,302 A | 10/1996 | Khalidi et al. | |
| 5,571,245 A | 11/1996 | Ooyabu et al. | |
| 5,572,643 A | 11/1996 | Judson | 395/793 |
| 5,574,898 A | 11/1996 | Leblang et al. | |
| 5,581,765 A | 12/1996 | Munroe et al. | |
| 5,598,562 A | 1/1997 | Cutler et al. | |
| 5,619,638 A | 4/1997 | Duggan et al. | |
| 5,623,656 A | 4/1997 | Lyons | 395/610 |
| 5,657,390 A | 8/1997 | Elgamal et al. | 380/49 |
| 5,689,664 A | 11/1997 | Narayanan et al. | |
| 5,692,183 A | 11/1997 | Hapner et al. | |
| 5,701,451 A | 12/1997 | Rogers et al. | 395/600 |
| 5,710,918 A | 1/1998 | Lagarde et al. | 395/610 |
| 5,721,876 A | 2/1998 | Yu et al. | |
| 5,737,592 A | 4/1998 | Nguyen et al. | 395/604 |
| 5,737,622 A | 4/1998 | Rogers et al. | 713/324 |
| 5,752,031 A | 5/1998 | Cutler et al. | |
| 5,754,830 A | 5/1998 | Butts et al. | 395/500 |
| 5,764,915 A | 6/1998 | Heimsoth et al. | |
| 5,768,505 A | 6/1998 | Gilchrist et al. | |
| 5,819,093 A | 10/1998 | Davidson et al. | |
| 5,838,906 A | 11/1998 | Doyle et al. | 395/200.32 |
| 5,838,910 A | 11/1998 | Domenikos et al. | 395/200.33 |
| 5,838,916 A | 11/1998 | Domenikos et al. | 395/200.49 |
| 5,850,548 A | 12/1998 | Williams | |
| 5,859,971 A | 1/1999 | Bittinger et al. | |
| 5,872,973 A | 2/1999 | Mitchell et al. | |
| 5,877,757 A | 3/1999 | Baldwin et al. | 345/336 |
| 5,905,987 A | 5/1999 | Shutt et al. | |
| 5,933,841 A * | 8/1999 | Schumacher et al. | 715/501.1 |
| 5,937,160 A | 8/1999 | Davis et al. | |
| 5,938,733 A | 8/1999 | Heimsoth et al. | |
| 5,946,687 A | 8/1999 | Gehani et al. | |
| 5,946,697 A | 8/1999 | Shen | |
| 5,973,696 A | 10/1999 | Agranat et al. | |
| 5,978,828 A | 11/1999 | Greer et al. | |
| 5,978,842 A | 11/1999 | Noble et al. | |
| 5,978,848 A | 11/1999 | Maddalozzo, Jr. et al. | 709/227 |
| 5,983,227 A * | 11/1999 | Nazem et al. | 707/10 |
| 5,983,268 A | 11/1999 | Freivald et al. | |
| 6,012,087 A | 1/2000 | Freivald et al. | |
| 6,029,182 A * | 2/2000 | Nehab et al. | 715/523 |
| 6,094,662 A | 7/2000 | Hawes | |
| 6,101,510 A | 8/2000 | Stone et al. | |
| 6,112,242 A | 8/2000 | Jois et al. | 709/225 |
| 6,161,126 A | 12/2000 | Wies et al. | 709/203 |
| 6,192,382 B1 | 2/2001 | Lafer et al. | |
| 6,209,029 B1 | 3/2001 | Epstein et al. | |
| 6,271,858 B1 | 8/2001 | Dalal et al. | |
| 6,275,858 B1 | 8/2001 | Bates et al. | |
| 6,304,895 B1 | 10/2001 | Schneider et al. | |
| 6,305,012 B1 | 10/2001 | Beadle et al. | |
| 6,311,185 B1 | 10/2001 | Markowitz et al. | |
| 6,311,187 B1 * | 10/2001 | Jeyaraman | 707/10 |
| 6,313,854 B1 | 11/2001 | Gibson | |
| 6,314,456 B1 | 11/2001 | Van Andel et al. | |
| 6,360,250 B1 | 3/2002 | Anupam et al. | |
| 6,363,398 B1 | 3/2002 | Andersen | |
| 6,393,422 B1 * | 5/2002 | Wone | 707/10 |
| 6,397,253 B1 | 5/2002 | Quinlan et al. | |
| 6,434,738 B1 | 8/2002 | Arnow | |
| 6,457,103 B1 | 9/2002 | Challenger et al. | |
| 6,480,865 B1 | 11/2002 | Lee et al. | |
| 6,507,856 B1 | 1/2003 | Chen et al. | |
| 6,515,681 B1 * | 2/2003 | Knight | 345/751 |
| 6,539,418 B2 | 3/2003 | Schneider et al. | |
| 6,557,076 B1 | 4/2003 | Copeland et al. | |
| 6,560,639 B1 | 5/2003 | Dan et al. | |
| 6,571,245 B2 | 5/2003 | Huang et al. | |
| 6,587,858 B1 | 7/2003 | Strazza | |
| 6,622,168 B1 | 9/2003 | Datta | |
| 6,631,512 B1 | 10/2003 | Onyeabor | |
| 6,643,657 B1 | 11/2003 | Baird et al. | |
| 6,655,586 B1 | 12/2003 | Back et al. | |
| 6,658,624 B1 | 12/2003 | Savitzky et al. | |
| 6,684,388 B1 | 1/2004 | Gupta et al. | |
| 6,701,380 B2 | 3/2004 | Schneider et al. | |
| 6,701,388 B1 | 3/2004 | Smith et al. | |
| 6,715,129 B1 | 3/2004 | Hind et al. | |
| 6,738,804 B1 | 5/2004 | Lo | |
| 6,742,045 B1 | 5/2004 | Albert et al. | |
| 6,751,778 B1 | 6/2004 | Broman et al. | |
| 6,826,594 B1 | 11/2004 | Pettersen | |
| 2001/0042173 A1 | 11/2001 | Bala et al. | |
| 2002/0004813 A1 | 1/2002 | Agrawal et al. | 709/201 |
| 2002/0007376 A1 | 1/2002 | Popp et al. | 707/513 |
| 2002/0042173 A1 | 4/2002 | Takamura | |
| 2002/0049788 A1 | 4/2002 | Lipkin et al. | 707/513 |
| 2002/0059327 A1 | 5/2002 | Starkey | 707/203 |
| 2002/0065851 A1 | 5/2002 | Watson et al. | 707/513 |
| 2002/0099738 A1 | 7/2002 | Grant | 707/513 |
| 2003/0079120 A1 | 4/2003 | Hearn et al. | 713/150 |
| 2005/0097008 A1 | 5/2005 | Ehring et al. | |

FOREIGN PATENT DOCUMENTS

| | | |
|---|---|---|
| EP | 0 483 576 A2 | 5/1992 |
| EP | 1016987 | 7/2000 |
| EP | 1016987 A2 | 7/2000 |
| WO | WO 97/18635 | 5/1997 |
| WO | 99/59087 | 11/1999 |
| WO | WO 99/59087 | 11/1999 |

OTHER PUBLICATIONS

"The Animator Applet." [retrieved on Jun. 1, 1999].
Tessier, Tom. "Using JavaScript to Create Interactive Web Pages." *Dr. Dobb's Journal*. (Mar. 1996), pp. 84, 86-89,96-97.
Singleton, Andrew. "Wired on the Web." pp. 77-78, 80.
Davis, Philip. "An Interactive Hypermedia Map Viewer." *DATABASE*, (Apr. 1995), pp. 65-67.
Chu, Josey et al. "Creating a hypertext markup language document for an information server." *Behavior Research Methods, Instruments & Computers*, (1995), pp. 200-205.
Putz, Steve. "Interactive information services using World-Wide Web hypertext." *Computers Networks and ISDN Systems*, (1994), pp. 273-280.
Droms, R. "Dynamic Host Configuration Protocol." (Oct. 1993), pp. 1-39.
van Hoff, Arthur. "Java and Internet Programming." pp. 56,58-59, 101-102.

U.S. Appl. No. 09/704,904, filed Nov. 2, 2001, Hayton et al.
U.S. Appl. No. 09/704,948, filed Nov. 2, 2001, Hayton et al.
U.S. Appl. No. 09/705,170, filed Nov. 2, 2001, Hayton et al.
U.S. Appl. No. 09/704,857, filed Nov. 2, 2001, Hayton et al.
U.S. Appl. No. 09/704,897, filed Nov. 2, 2001, Hayton et al.
Challenger J. et al., "A Publishing System for Efficiently Creating Dynamic Web Content", IEEE Infocom 2000, pp. 844-853.
Liu H. et al., "Model and Research Issues for Refreshing a Very Large Website", Web Information Systems Engineering, 2000, pp. 291-295.
Sneed H.M. et al., "A Case Study in Software Wrapping", Proceedings of the International Conference on Software Maintenance, ICSM 1998, pp. 86-93.
International Searching Authority, "International Search Report", PCT Application No. PCT/US01/45272, mailed on Apr. 4, 2003, 5 pgs.
Steelman, Mary J., Office Action, U.S. Appl. No. 09/704,948, p. 1-13.
Berberich, Mitchel and Bamberger, Stefan, "Building Web-based Knowledge Clusters", p. 1-4, IEEE, Jun. 26, 1998, retrieved from IEEE database Nov. 17, 2003.
Goschka, Karl M., Rielding, Eveline, "Development of an Object Oriented Framework for Design and Implementation of Database Powered Distributed Web Applications with the DEMETER Project as a Real-Life Example," p. 132-137, IEEE, 1997 retrieved Nov. 17, 2003.
McIlhagga, Malcom, Light, Ann and Wakeman, Ian, "Towards a Design Methodology for Adaptive Applications", p. 133-144, 1998, ACM Portal Database, retrieved Nov. 17, 2003.
U.S. Appl. No. 60/184,624.
U.S. Appl. No. 60/187,925, Agrawal et al.
Jem, Michael, "'Thin' vs 'Fat'" Visualization Client, IIEE, pp. 772-788 (1998).
Köppen, E. et al. "A practical approach towards active hyperlinked documents", Computer Networks and ISDN Systems 30:251-258(1998).
EPO International Preliminary Examination Report to PCT/US00/34848 (May 6, 2002) 6 pages.
EPO International Search Report to PCT/US00/34848 (May 18, 2001) 7 pages.
AU Examiner Report on 24480/01 (Oct. 9, 2003) 2 pages.
EPO "Communication pursuant to 96(2) EPC" 00 988 253.1-2201 (Aug. 25, 2003) 4 pages.
EPO "Communication pursuant to 96(2) EPC" 00 988 253.1-2201 (Oct. 17, 2002) 2 pages.
U.S. Appl. No. 09/470,825, filed Dec. 23, 1999.
U.S. Appl. No. 09/704,857, filed Nov. 2, 2000.
U.S. Appl. No. 09/704,904, filed Nov. 2, 2000.
U.S. Appl. No. 09/704,948, filed Nov. 2, 2000.
U.S. Appl. No. 09/705,170, filed Nov. 2, 2000.
U.S. Appl. No. 09/704,897, filed Nov. 2, 2000.
Herb, "The Animator Applet (1.0.2)—example 1" in http://www.columbia.edu/cu/help/jdk/demo/Animator/1.0.2/Animator.java vol. 1.9 pp. 19 pgs., Dec. 6, 1996.
International Searching Authority, "International Search Report," PCT Application No. PCT/US01/45272, mailed on Apr. 4, 2003, 5 pgs.
Abe, et al., "Distributed Cooperative Control for Sharing Applications Based on the MERMAID Multiparty and Multimedia Desktop Conferencing System," NEC Research & Development, Tokyo, Japan, 34(1):122-131, Jan. 1992.
Cheng, et al., "On the Performance Issues of Object-Based Buffering," Parallel and Distributed Information Systems, International Conference, IEEE, pp. 30-37, 1991.
Chu, et al., "Creating a Hypertext Markup Language Document for an Information Server," Behavior Research Methods, Instruments & Computers, Psychonomic Society, Inc., 27(2):200-205, 1995.
Davis, The Xerox PARC Map Server: An Interactive Hypermedia Map Viewer, Database, pp. 65-67, Apr./May 1995.
Droms, "Dynamic Host Configuration Protocol," Network Working Group, Request for Comments: 1541, Bucknell University, pp. 1-39, Oct. 1993.
Mitchell, "Leveraging Your Visual C++ Experience on the Internet with Thin Client Technology," Microsoft Systems Journal, Microsoft Corporation, pp. 1-16, Dec. 1996.
Singelton, "Wired on the Web," Wired, pp. 77-78 and 80, 1995.
Tessier, "Using JavaScript to Create Interactive Web Pages," Dr. Dobb's Journal, Boulder, Colorado, pp. 84-97, Mar. 1996.
Aycock, et al., "An Architecture for Easy Web Page Updating," Crossroads, vol. 6, Issue 2, published by ACM Press, 1999, pp. 1-8.

* cited by examiner

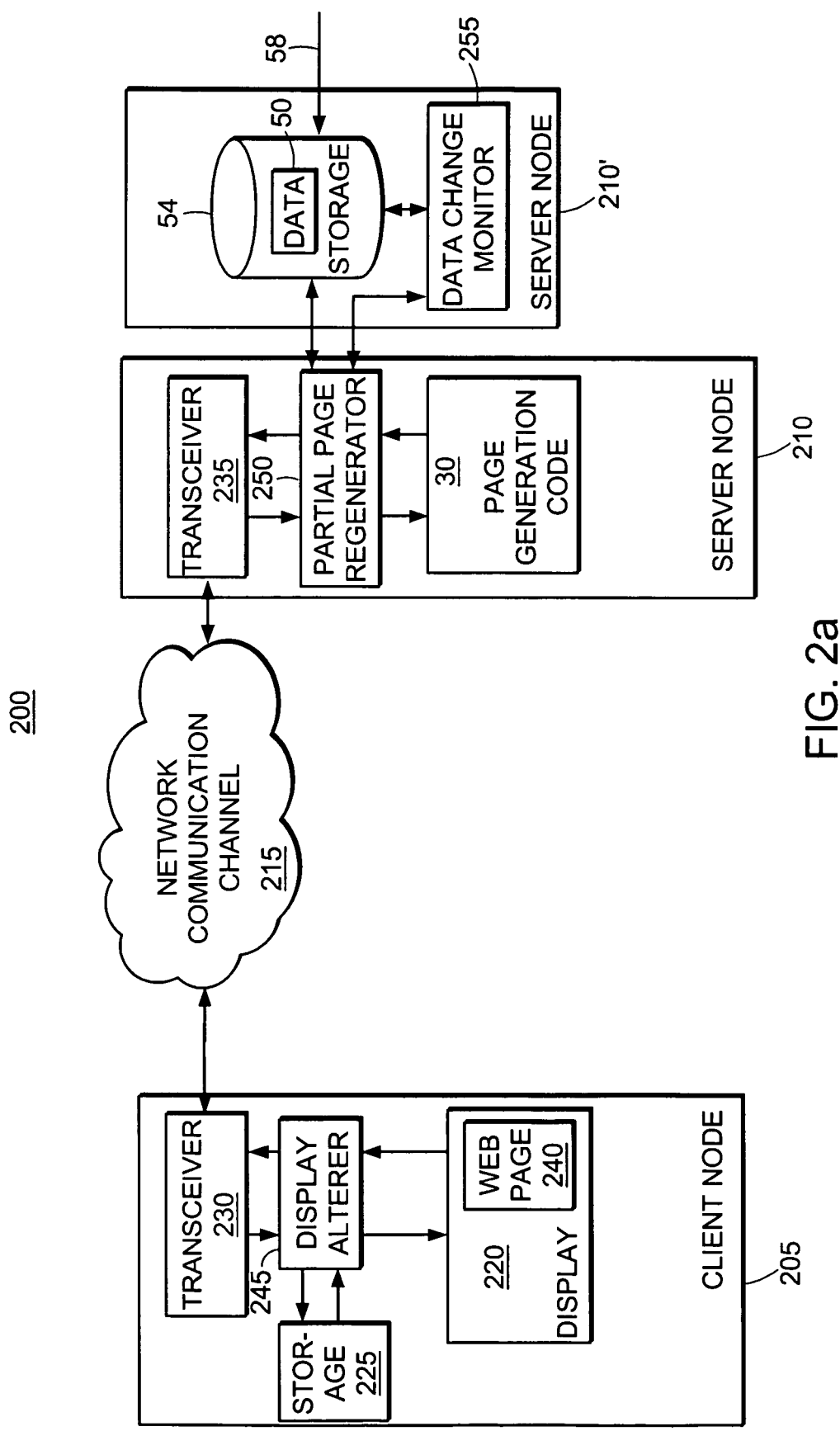

ORIGINAL
CGI CODE

265a"
'main'

265b" 'do table'
s = getShares
for i in shares
doShare(i)

265c" doShare 'i'
n = getName(i)
p = getPrice(i)
write (n "current price is" p)

METHODS AND APPARATUS FOR INCORPORATING A PARTIAL PAGE ON A CLIENT

FIELD OF THE INVENTION

The present invention relates generally to apparatus and methods for updating a page sent to a client for display. More specifically, the invention relates to an apparatus and method for regenerating and retransmitting changed portions of the page sent to a client.

BACKGROUND OF THE INVENTION

Computer communication networks typically include one or more nodes called servers and one or more nodes termed clients. A server provides a service to a client upon receiving a request from the client. FIG. 1 illustrates an example of a service that a network 10 may provide. The client 14 communicates with the server 22 using a communication channel 20. The client 14, via its web browser, transmits (arrow 18) a request to the server 22 for a web page 26. The server 22 executes (arrow 34) all of the page generation code 30 to generate a complete web page 26 and transmits (arrow 38) the web page 26 for display on (arrow 42) the client 14. The generated page 26 represents a snapshot of the state of the server-side data 50 at the point in which the page generation code 30 was executed (arrow 34).

For example, consider that the page generation code 30 generates the page 26 so as to include a list of share prices for certain stocks. The server 22 retrieves (arrow 46) the data 50 (i.e., share price) that was stored in the server storage buffer 54 or received (arrow 58) by the server 22 at the point of time in which the program was executed (arrow 34), or sometime before then. The server transmits (arrow 38) and the client displays (arrow 42) the entire generated page 26. The page 26 remains displayed on the client 14 until the client 14 requests (arrow 18) a refresh of the page 26 (i.e., another transmission of the page 26 with a snapshot of the state of the server-side data 50 at the time of the refresh request). Upon such a request (arrow 18), the server 22 re-executes (arrow 34) the page generation code 30 and transmits the new generated page 26 to (arrow 38) the client 14.

Some systems may have a periodic update, where the client requests (arrow 18) a refresh of the page 26 every specified period of time. Upon re-executing (arrow 34) all of the page generation code 30, the server 22 generates another complete page 26. Again, the page 26 represents a snapshot of the state of the server-side data 50 at the point in which the server 22 re-executes (arrow 34) all of the page generation code 30. The data 50 (e.g., share price) in the generated page 26 may be the same as the period before, thus making the execution (arrow 34) of the page generation code 30 and the transmission (arrow 38) of the page 26 unnecessary. Even when the data has changed, the majority of the page 26 will be static elements, which are unchanged.

Neither the manual nor periodic update keeps the user timely informed of data 50 as the data 50 changes. The updates are almost unrelated to the changes in the data 50; for example, a page 26 can be transmitted although no data has changed. This update unnecessarily uses network communication channel resources, client resources and server resources.

SUMMARY OF THE INVENTION

The invention relates to a method and apparatus for regenerating portions of the page that have changed and transmitting only those portions to the client for the display. Executing only the necessary parts of the page generation code and transmitting only changes to the client improves the efficiency of using the resources of the network communication channel, the client node and the server node. Performing these operations only when required, when the data has changed, improves the efficiency of use even further. The invention also takes advantage of any portions of the page that are already on the client by reusing them and thus eliminates the need to regenerate or transmit those reusable portions.

In one aspect, the invention relates to a method for incorporating a partial page into a transmitted page displayed on a client. The method includes displaying the transmitted page on a client, receiving by the client a regenerated portion of the transmitted page from a server and incorporating by the client the regenerated portion into the transmitted page displayed on the client. In one embodiment, the method includes receiving by the client a modification list from the server instructing the client on the incorporation of the regenerated page portion into the transmitted page. In another embodiment, the method includes receiving by the client additional code instructing the client on how to interpret commands contained in the modification list.

In another embodiment, the step of incorporation includes copying a first portion of the transmitted page displayed on the client and inserting the copied first portion into a second portion of the transmitted page displayed on the client. In another embodiment, the method includes changing an identification tag of the copied first portion inserted in the second portion from a first value to a non-identical second value. In another embodiment, the method includes moving a first portion of the transmitted page to a second portion. In another embodiment, the step of moving further includes saving the first portion in a storage buffer. In another embodiment, the step of moving further includes moving the first portion of the transmitted page to a second portion within the regenerated portion. In another embodiment, the method includes changing an identification tag of the first moved portion from a first value to a non-identical second value. In another embodiment, the step of incorporation includes replacing a portion of the transmitted page with the regenerated portion.

In another aspect, the invention relates to a client for incorporating a partial page into a transmitted page. The client includes a transceiver that receives the transmitted page and any partial portions thereof and a display alterer in communication with the transceiver. The display alterer receives a regenerated portion of the transmitted page from a server and incorporates the regenerated page portion into the transmitted page displayed on the client. In one embodiment, the display alterer receives a modification list from the server instructing the client on the incorporation of the regenerated portion into the transmitted page. In another embodiment, the display alterer receives additional code instructing the client on how to interpret commands contained in the modification list. In another embodiment, the client includes a storage buffer in communication with the display alterer, the storage buffer storing a first portion of the transmitted page displayed on the client for use in incorporating the regenerated portion.

In another aspect, the invention relates to a system for incorporating a partial page into a transmitted page. The system includes an external page code source, a client that includes a client transceiver that receives the page and a display alterer in communication with the client transceiver. The display alterer receives a regenerated portion of the transmitted page from a server and incorporates the regenerated page portion into the transmitted page displayed on the client. The system further includes a server that includes a server transceiver in communication with the client, the server transceiver transmitting the page to the client for display and a partial page regenerator in communication with the server transceiver and the external page code source. The partial page regenerator receives from the external page code source page generation code that generates the page and executes an associated fragment of the code to regenerate a portion of the transmitted page.

In one embodiment, the display alterer of the client receives a modification list from the server instructing the client on the incorporation of the regenerated portion into the transmitted page. In another embodiment, the display alterer of the client receives additional code instructing the client on how to interpret commands contained in the modification list. In another embodiment, the client includes a storage buffer in communication with the display alterer, the storage buffer storing a first portion of the transmitted page displayed on the client for use in incorporating the regenerated portion.

BRIEF DESCRIPTION OF THE DRAWINGS

The foregoing and other objects, features and advantages of the present invention, as well as the invention itself, will be more fully understood from the following description of preferred embodiments, when read together with the accompanying drawings.

FIG. 2a is a diagram of an exemplary client/server network embodying the principle of the invention.

FIG. 4a is a block diagram of fragments of CGI page generation code.

DETAILED DESCRIPTION OF PREFERRED EMBODIMENTS 1.0 Partial Page Regeneration System In broad overview, FIG. 2a illustrates an exemplary embodiment of a partial page regeneration system 200 that includes a first computing system ("client node") 205 in communication with a second computing system ("server node") 210 over a network 215. For example, the network 215 can be a local-area network (LAN), such as a company Intranet or a wide area network (WAN) such as the Internet or the World Wide Web. A user of the client node 205 can be connected to the network 215 through a variety of connections including standard telephone lines, LAN or WAN links (e.g., T1, T3, 56 kb, X.25), broadband connections (ISDN, Frame Relay, ATM), and wireless connections. The client node 205 includes a client transceiver 230 to establish communication with the network 215. The server node 210 includes a server transceiver 235 to establish communication with the network 215. The connections can be established using a variety of communication protocols (e.g., HTTP TCP/IP, IPX, SPX, NetBIOS, Ethernet, RS232, and direct asynchronous connections).

Figure 1:
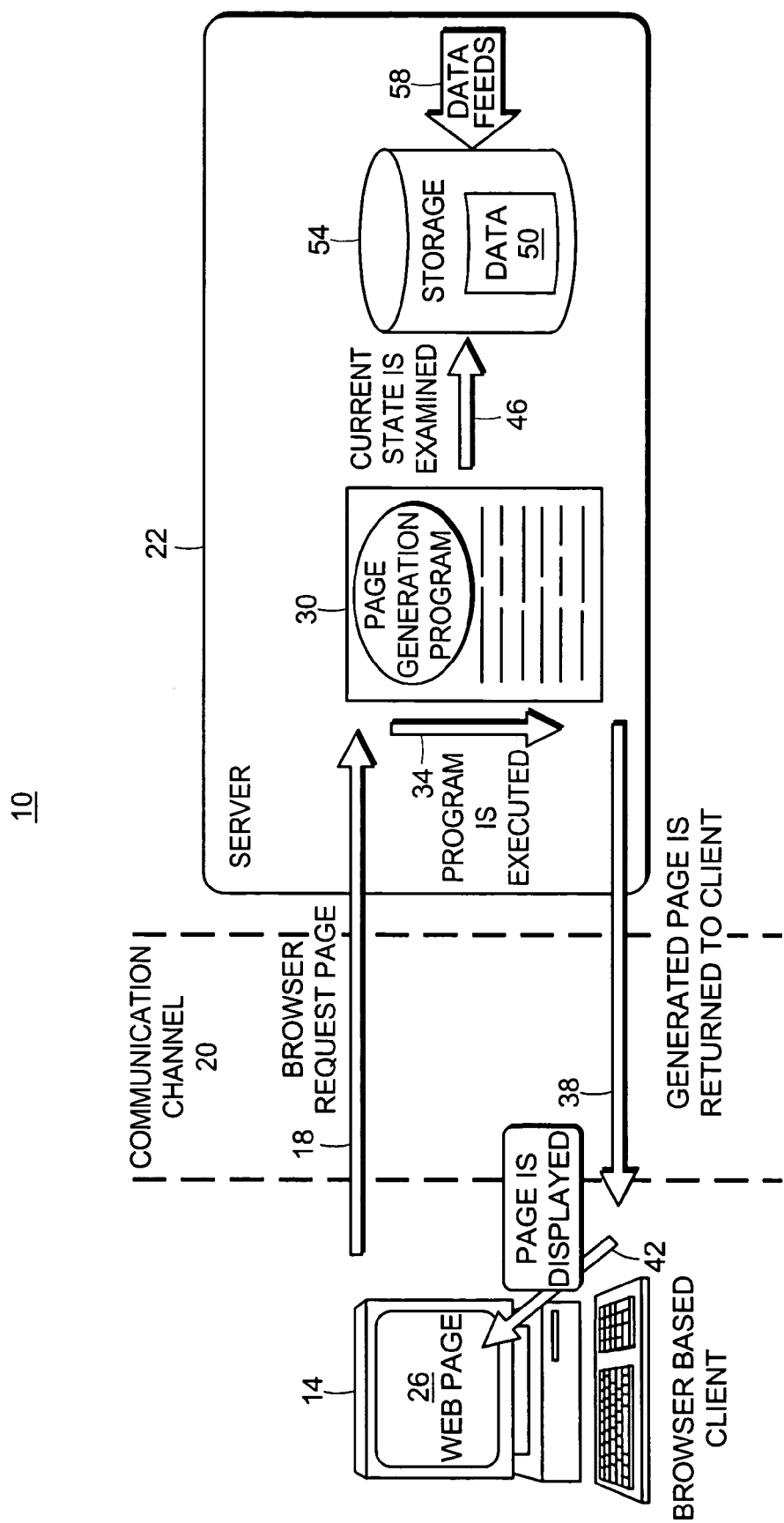
FIG. 1 is a diagram of a client/server network as known in the prior art.

The client node 205 can be any computing device (e.g., a personal computer, set top box, phone, handheld device, kiosk, etc) used to provide a user interface (e.g., web browser) to an application or web page, or to otherwise present data stored or accessed via the server node 210. The client node 205 includes a display 220, a storage buffer 225, the client transceiver 230 and a display alterer 245. The display alterer 245 is in communication with the client transceiver 230 for transmitting requests to the server node 210 for an update of a web page 240. The display alterer 245 also receives the web page 240 or portions of the web page 240 sent from the server node 210 through the client transceiver 230. The display alterer 245 is in communication with the display 220 for displaying the web page 240 or for incorporating received updated portions of the web page 240 into the currently displayed web page 240. The display alterer 245 is in communication with the storage buffer 225 for temporarily storing web page data needed for the incorporation of the received updated portions of the web page 240. The storage buffer 225 can include persistent and/or volatile storage.

The server nodes 210 and 210' can be any computing device capable of providing the requested services of the client node 205, particularly generating and transmitting portions of the transmitted web page 240. It is to be understood that more or fewer servers than those shown in FIG. 2a can be connected to the network 215. In one embodiment, the server nodes 210 and 210' are two separate computing devices. In another embodiment, the server nodes 210 and 210' are a single computing device. Either implementation is equivalent for practicing the principles of the invention, and thus the reference to a server node 210 hereafter represents either configuration or another equivalent configuration.

The server node 210 includes the server transceiver 235, a partial page regenerator 250, page generation code 30, a storage buffer 54 and a data change monitor 255. The server node 210 can receive the page generation code 30 from any source. In one embodiment, the page generation code 30 can be on another physical device that is in communication with the physical device (e.g., server node 210) on which the partial page regenerator 250 resides. In another embodiment, the source can be a programmer who creates the page generation code 30 and stores the code 30 on the server node 210 to accommodate requests from the client node 205. The page generation code 30 can be written in any language and in any format that the server node 210 uses to generate a web page 240. Examples of format for the page generation code 30 include a servlet, a JAVA Server Page ("JSP"), an Active Server Page ("ASP"), a template language, and/or a Common Gateway Interface ("CGI") script.

During operation of the page regeneration system 200, the server node 210 generates and transmits to the client node 205 only those portions of a currently displayed web page 240 that have changed since the web page 240 (or portions of the web page 240) were last transmitted to the client node 205. The client node 205 incorporates those page portions into the currently displayed page 240.

1.1 Portions of a Page and Fragments of Page Generation Code

Figure 2B:
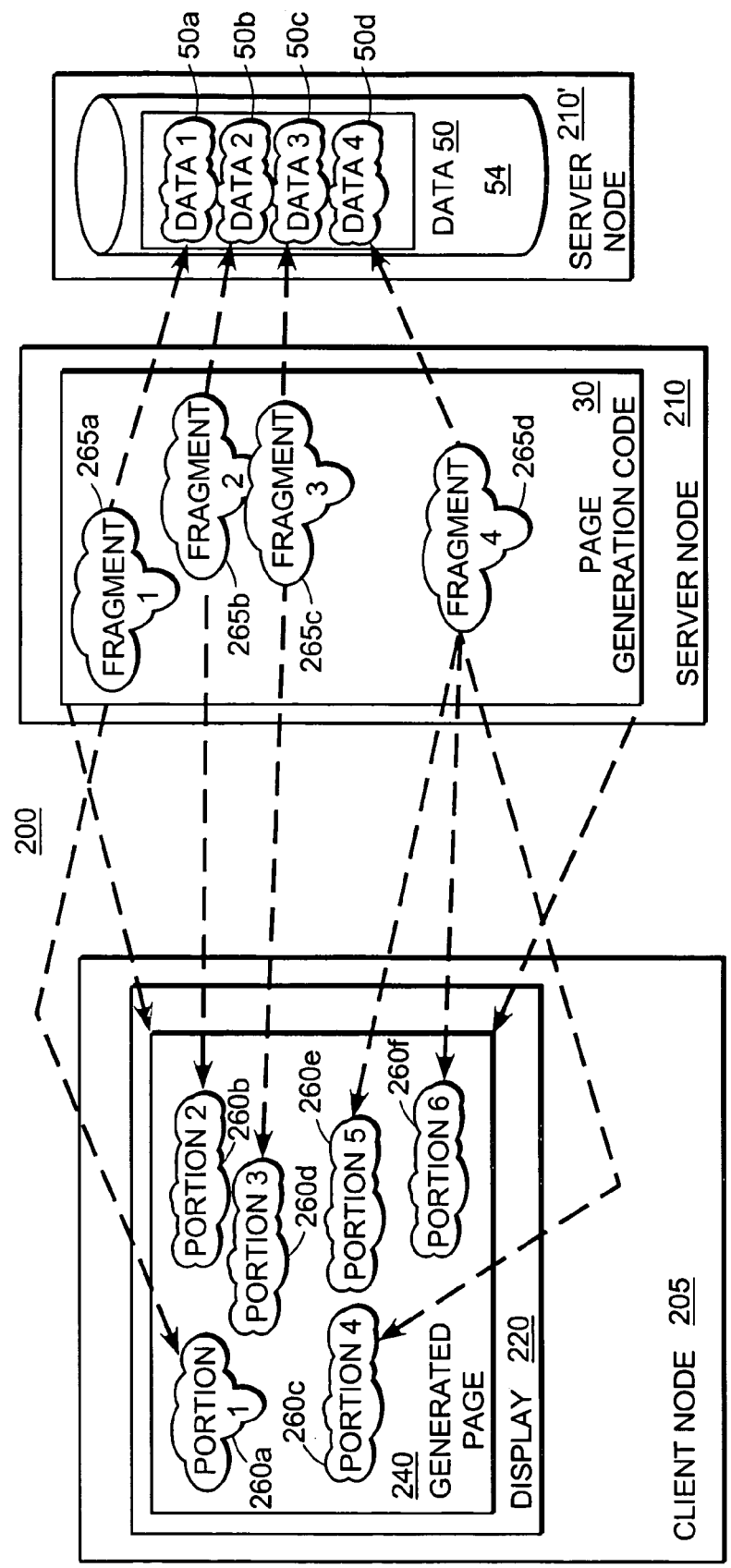
FIG. 2b is a block diagram of an embodiment of the invention illustrating a correspondence between fragments of page generation code and portions of the generated page and a correspondence between the fragments of page generation code and data stored in a storage device.

As shown in FIG. 2b, the web page 240 includes a plurality of page portions 260a, 260b, 260c, 260d, 260e, and 260f (generally referred to as 260). The page generation code 30 includes a plurality of code fragments 265a, 265b, 265c, 265d (generally referred to as 265). FIG. 2b illustrates an example of the correspondences between page portions 260a, 260b, 260c, 260d 260e, 260f of the web page 240 and the code fragments 265a, 265b, 265c, 265d of the page generation code 30 that generate the corresponding page portions 260. Examples of format for the web page 240, and thus of the page portions 260, include HTML, XML, VRML, WML, (display) postscript and nroff. Each code fragment 265 generates one or more page portions 260. For example, as illustrated in FIG. 2b, code fragment 265d generates page portions 260c, 260e and 260f.

FIG. 2b also illustrates an example of the correspondences between code fragments 265 of the page generation code 30 and the corresponding data 50a, 50b, 50c, 50d (generally referred to as 50) upon which the code fragments 265 depend. In other words, the data 50 upon which the code fragments 265 depend is the data 50 that the code fragment 265 uses to generate the corresponding page portion 260. Though the embodiment shown has one data element (e.g., 50a) for one fragment (e.g., 265a), this relationship can vary. For example, one code fragment may depend on several data elements, and one data element may be have many code fragments dependent on it.

Referring back to FIG. 2a, the partial page regenerator 250 is in communication with the server transceiver 235 for receiving requests from the client node 205 to refresh the web page 240. The partial page regenerator 250 transmits the web page 240, or portions 260 of the web page 240, to the server transceiver 235 in response to such requests, for transmission to the client node 205. The partial page regenerator 250 is in communication with the page generation code 30 for executing code fragments 265 of the page generation code 30 to create corresponding page portions 260 of the web page 240. The partial page regenerator 250 also determines the data 50 in the storage buffer 54 that the code fragments 265 use to generate the corresponding page portions 260. The partial page regenerator 250 is in communication with the data change monitor 255 to receive notice of any change in the data 50 in the storage buffer 54 upon which the code fragments 265 depend.

1.2 Identifying a Code Fragment

The partial page regenerator 250 identifies code fragments 265 in the page generation code 30. To identify code fragments 265, the partial page regenerator 250 identifies processes (e.g., methods in an object-oriented language, subroutines, functions) that meet one or more criteria. For example, in one embodiment the criterion is that the code fragment 265 (e.g., process) is idempotent, or provides indempotentcy. That is, the code fragment 265 produces identical results every time that code fragment 265 is called with the same arguments and the same dependent data 50. In other words, when the code fragment 265 is executed there are no side effects that change the results of calls to other code fragments (e.g., no updating of global counters) or that change dependent data 50.

The idempotent property allows the partial page regenerator 250 to substitute a previously cached output generated by the code fragment for another page portion generated by the same code fragment, rather than calling that code fragment again. For example, as depicted in the embodiment in FIG. 2b, code fragment 265d generates page portion 260c. Instead of executing code fragment 265d two more times, page portions 260e and 260f can be generated simply be copying the portion 260c because the property of the fragment 265d is such that the fragment 265d will produces the same output each time it is called with the same arguments.

The partial page regenerator 250 determines that a process (e.g., method in an object-oriented language, subroutine, function) in the page generation code 30 meets this criterion by verifying, for example, that the process does not contain any global variables that the process changes. If the process meets the criterion, the partial page regenerator 250 identifies the process as a code fragment 265 in a map of correspondences 300 (FIG. 7) that the partial page regenerator 250 generates.

For example, another embodiment uses the criterion that a process (e.g., method in an object-oriented language, subroutine, function) generates output (e.g., HTML code) that defines one or more page portions 260 of the web page 240. The partial page regenerator 250 determines that a process meets this criterion by verifying, for example, that the process includes a certain return type (e.g., returns String). In other embodiments, the partial page regenerator 250 verifies the process follows a certain predefined naming convention (e.g., called fragment_x), and/or a certain predefined annotation to the process (e.g., #define foo_is_a_fragment). In certain formats, JSP for example, embedded tags may exist that match pieces of the code 30 to portions of the page 240 that the pieces generate. In these formats, the tags can be used as identifying code fragments 265. In other embodiments the partial page regenerator 250 verifies the process includes other certain additional attributes, such as being included in a list of process names provided to the partial page regenerator 250 at runtime (i.e., when the page generation code 30 is executed).

In one embodiment, the partial page regenerator 250 examines the page generation code 30 using a standard JAVA technique 'introspection'. An advantage is that the partial page regenerator 250 does not need to decompile or have source access to the page generation code 30. This allows the partial page regenerator 250 to work with any page generation code 30, regardless of restrictions (e.g., physical or license restrictions) to source access of the page generation code 30.

1.3 Wrapping a Code Fragment with Additional Code

After identifying the code fragments 265, the partial page regenerator 250 needs the ability to execute the code fragments 265 individually from and independently of other parts of the page generation code 30. Because the page generation code 30 is written to be executed in its entirety, the partial page regenerator 260 must create additional code, relating to the page generation code 30, to selectively control execution of the code fragments. To do this, the partial page regenerator 250 augments the page generation code 30 to enable individual and independent execution of each of the code fragments 265.

In one embodiment, the additional code takes the same name as the code fragment 265 that the additional code is augmenting. By taking the same name, the additional code is called and executed instead of the code fragment 265 of the partial page generation code 30. The additional code controls whether the code fragment 265 of the page generation code 30 with the same name is subsequently called and executed. This control allows the selective execution of the code fragments 265 of the page generation code 30.

1.3.1 Wrapping—A Servlet Format Example

Figures 3A, 3B:
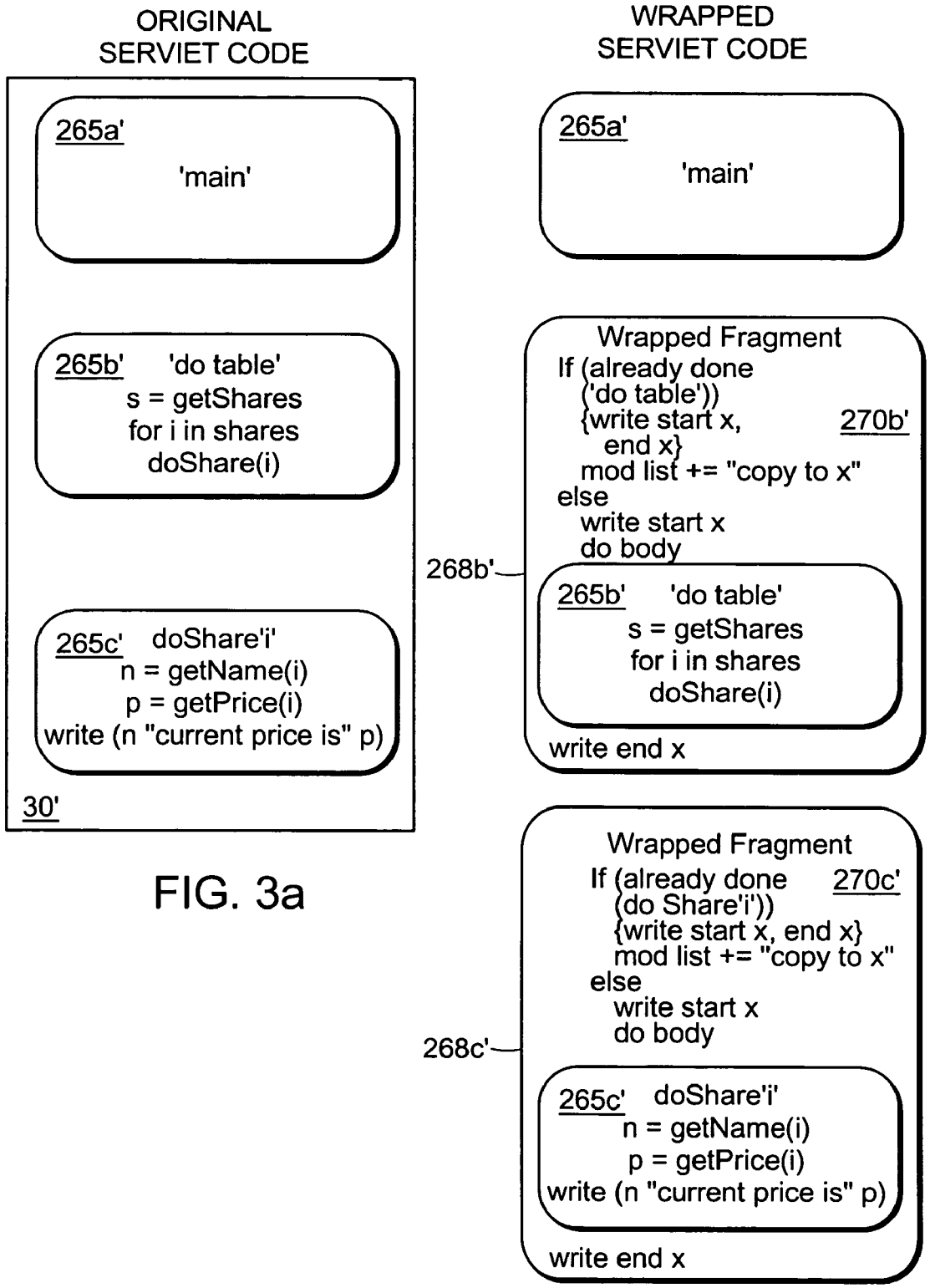
FIG. 3a is a block diagram of fragments or servlet page generation code.
FIG. 3b is a block diagram of fragments of the servlet page generation code augmented with additional code to control execution of individual fragments according to the invention.

FIG. 3*a* shows an embodiment of page generation code 30' having a servlet format and a plurality of code fragments 265*a'*, 265*b'*, 265*c'*. The code fragment 265*a'* identified as 'main' represents all of the header information and the static information of the web page 240. The code fragment 265*b'* identified as 'do table' represents the part (e.g., process, method) of the page generation code 30' that creates a table on the Web page 240. The code fragment 265*c'* identified as 'do Share' represents the process that creates an individual element of the table.

FIG. 3*b* illustrates the addition of code 270*b*, 270*c* (generally 270), sometimes referred to as code wrapping, to create wrapped code fragments 268*b'*, 268*c'*, respectively. The wrapped code fragments 268*b'*, 268*c'* are shown with the code fragments 265*b'*, 265*c'* enclosed within the wrapped code fragments 268*b'*, 268*c'*. In one embodiment, the code wrapping 270*b'*, 270*c'* as shown in FIG. 3*b* represents a logical connection only. In other words, the additional code 270*b'*, 270*c'* is not located in the page generation code 30', but in a different area on the server node 210. In that embodiment, only the code fragments 265*b'*, 265*c'* are physically located within the page generation code 30', as illustrated in FIG. 3*a*.

In one embodiment, to create the additional code 270, the partial page regenerator 250 examines the page generation code 30 as a .class file by using introspection. The partial page regenerator 250 then generates an additional JAVA file containing the additional code 270 defined as a subclass of the original page generation code 30. When compiled, the additional JAVA file becomes a subclass of the original page generation code 30. In another embodiment, the partial page regenerator 250 generates a .class file directly. In another embodiment, the partial page regenerator 250 performs the code wrapping when the page generation code 30 is executed and generates a class object that is stored in memory.

In the embodiment illustrated in FIG. 3*b*, the code fragments 265*b'* and 265*c'* have been wrapped with similar additional code 270*b'*, 270*c'*. The additional code 270*b'*, 270*c'* determines whether the code fragment 265*b'*, 265*c'* has already been executed with the same argument. If the code fragment 265*b'*, 265*c'* has been executed, which indicates that the code fragment generates multiple page portions, additional code 270*b'*, 270*c'* issues a command to copy the previously generated page portion into this duplicate page portion. If the code fragment 265*b'*, 265*c'* has not been executed, then the additional code 270*b'*, 270*c'* calls the code fragment (e.g., 265*b'*, 265*c'*) for execution.

In the additional code 270*b'*, 270*c'*, the term "x", used after the "start", "end" and "copy to" instructions, represents an identification tag that is used by the partial page regenerator 250 to identify each generated page portion 260. The term "mod list" represents a modification list that is sent to the client node 205 with the generated page portions 260. The modification list contains commands that instruct the client node 205 on how to incorporate the page portions 260 into the currently displayed page 240.

In the illustrated embodiment of FIG. 3*b*, the code fragment 'main' 265*a'* is not wrapped. After the initial transmittal of the page 240, the header and static information do not change and this code fragment 265*a'* is not executed again. Consequently, additional code 270 is not needed for the 'main' code fragment 265*a'*. All of the page portions 260 of the page 240 that can change are located in the "body" of the page 240, as represented by the 'do table' code fragment 265*b'* and the 'do Share' code fragment 265*c'*.

In another embodiment, if the page generation code 30 does not include a body page portion, the 'main' code fragment 265*a'* includes additional code (not shown) similar to the other wrapped code fragments 268*b'*, 268*c'*. The additional code (not shown) provides an identification tag for the 'body' part of the 'main' code fragment 265*a'*. The initial execution provides all of the necessary header information and static data to generate the page 240. A subsequent execution of the 'main' code fragment 265*a'* is made if the data that the 'main' code fragment 265*a'* depends on changes. The output of this re-execution is scanned and all but the content of the 'body' part is discarded. The 'main' code fragment 265*a'* can then be treated like any other code fragment.

1.3.2 Wrapping—A CGI Format Example

Figure 4B:
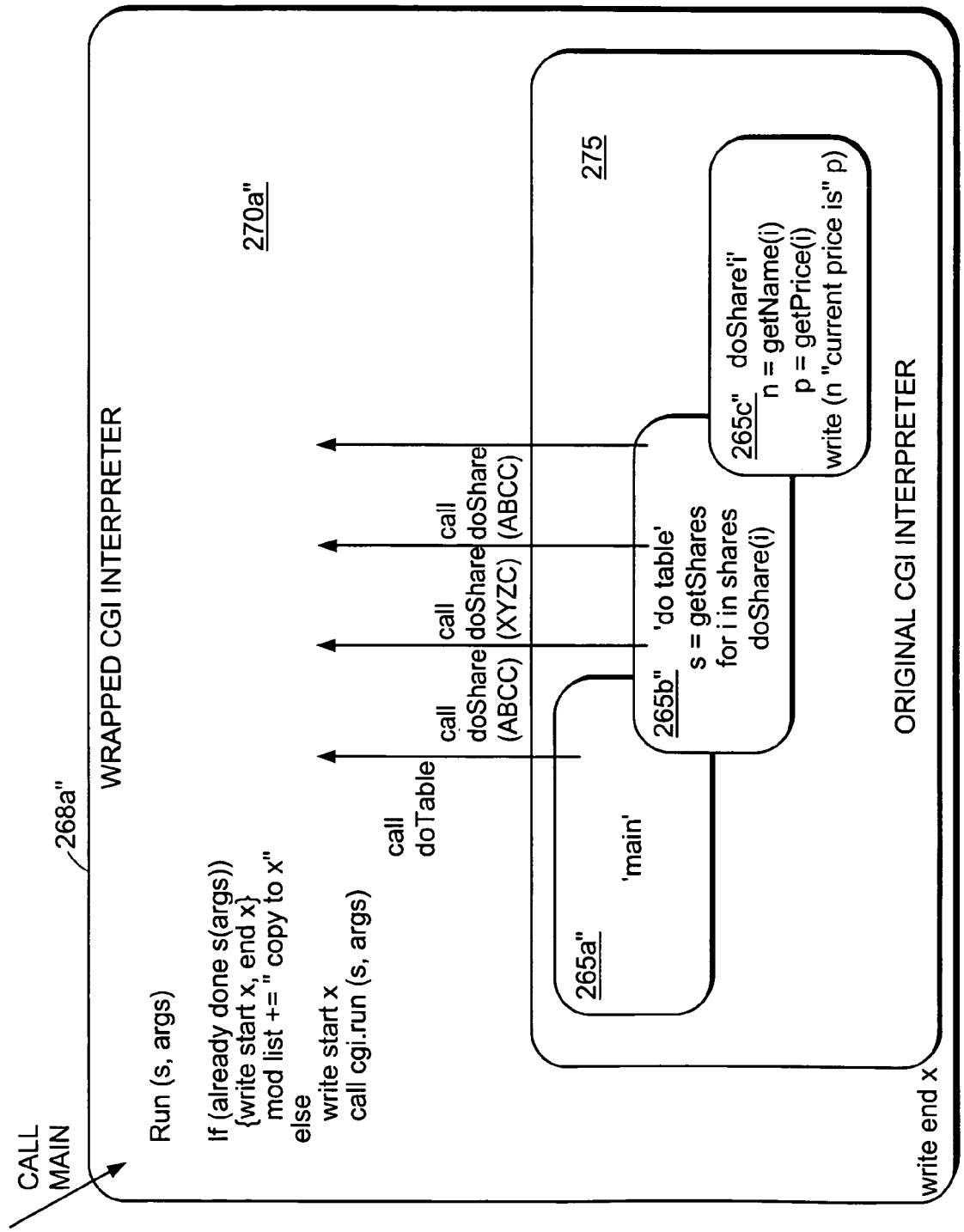
FIG. 4b is a block diagram of fragments of CGI page generation code augmented with additional code to control execution of individual fragments according to the invention.

FIG. 4*a* shows an embodiment of page generation code 30" having a CGI format and identified code fragments 265*a"*, 265*b"* and 265*c"*. In the CGI format, the code fragments 265*a"*, 265*b"*, 265*c"* each represent individual scripts. As illustrated in FIG. 4b, the functionality of additional code 270a″ is similar to the functionality of the additional code 270b′, 270c′ of the servlet format, but the implementation is different than that of the servlet format. The additional code 270a″ wraps a CGI Interpreter 275 to create a wrapped CGI Interpreter 268a″, instead of wrapping the individual code fragments 265a″, 265b″, 265c″ themselves. When each of the code fragments 265a″, 265b″, 265c″ (i.e., scripts) is called, the additional code 270a″ intercepts the call.

In another embodiment, there is a single script (e.g., page generation code 30″) and the code fragments 265a″, 265b″, 265c″ are not individual scripts, but represent subroutines of that script (e.g., 30″). In this embodiment, the CGI interpreter 275 is modified with the additional code 270a″, not wrapped, so that calls to invoke the subroutines of the script (e.g., code fragments 265a″, 265b″, 265c″) are intercepted.

1.3.3 Wrapping a JAVA Bean that Retrieves Data

Figure 4C:
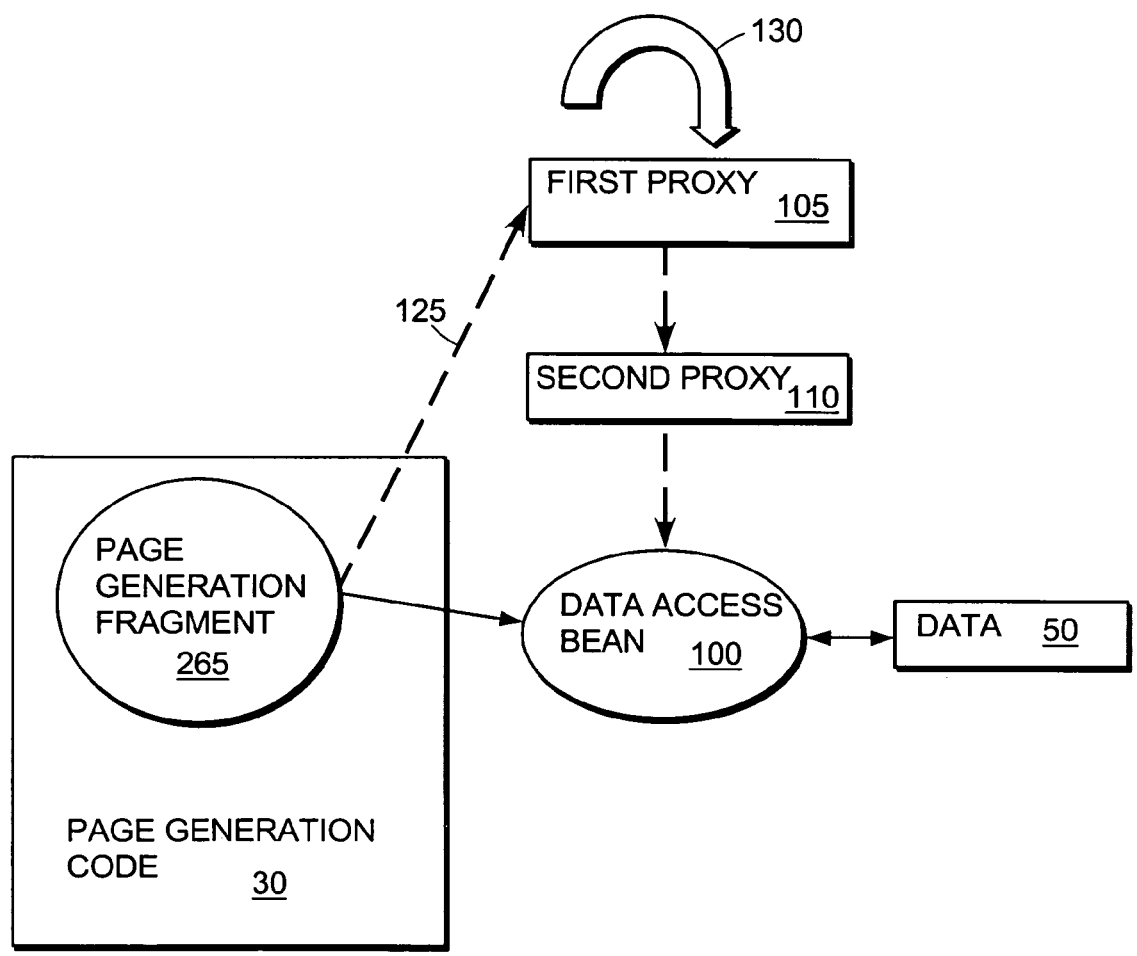
FIG. 4c is a block diagram of a method of wrapping using two proxies.

In addition to executing the code fragments 265 individually from and independently of other parts of the page generation code 30, the partial page generator 250 may also have to intercept access to the data 50 upon which the code fragments 265 depend. This is typically accessed via data access objects. FIG. 4c illustrates an exemplary embodiment where JAVA is used for implementation. In this embodiment, data 50 is typically accessed via one or more Java beans 100. The JAVA beans 100 themselves are logically separate from the page generation code 30 and are only responsible for managing access to the data 50. The beans 100 are not considered code fragments 265, as the do not directly generate output that produces the page 240.

To intercept and control access to data 50, the partial page regenerator 250 wraps the JAVA beans 100 that retrieve the data 50 with additional code (not shown). Each JAVA bean 100 is a class file, so the partial page regenerator 250 generates a wrapper class (e.g., proxy) for the JAVA bean 100. The partial page regenerator 250 identifies these processes (e.g., methods in an object-oriented language, subroutines) that retrieve data 50, for example, by searching for processes that match a naming convention. For example, for JAVA beans the naming convention is:

void set<propertyname>(Object)
Object get<propertyname>( )
etc.

Similarly as described above, an advantage of generating a wrapper class (e.g., proxy) for the JAVA bean 100 is that the JAVA bean code 100 remains unmodified, even during runtime. In one embodiment, the partial page regenerator 250 generates additional code for JAVA beans by generating two proxies 105, 110. The generation of two proxies is necessary because the proxy 105 called by the page generation code 30 has the original name of the original process of data access bean 100, so that the proxy 105 is invoked (arrow 125) instead of the original process, to allow interception of that original process. However, if the proxy 105 calls the original process 100, which has the same name, the JAVA classloader will incorrectly resolve this by calling (arrow 130) the proxy 105.

The partial page regenerator 250 generates a first proxy 105 that calls a second proxy 110, where the second proxy 110 has a different, arbitrary name. The second proxy 110 is invoked and then calls the original process 100. By arranging that the second proxy 110 and JAVA bean 100 exist in a different name space from the first proxy 105 and page generation code 30, using the two proxies 105, 110 and two namespaces allows for duplicative naming convention. The second namespace can be achieved using a second JAVA classloader. Though discussed as a technique for JAVA beans 100 that retrieve data 50, this two proxy technique is applicable to JAVA data access objects that are not JAVA beans. For example, this technique can be used to intercept access between a piece of code A and a piece of code B, providing that B does not reference A by class name, and that all (unnamed) references from B to A are also intercepted by the proxy.

1.3.4 Wrapping—An Example of Selected Execution and Generated Output

Figure 5A:
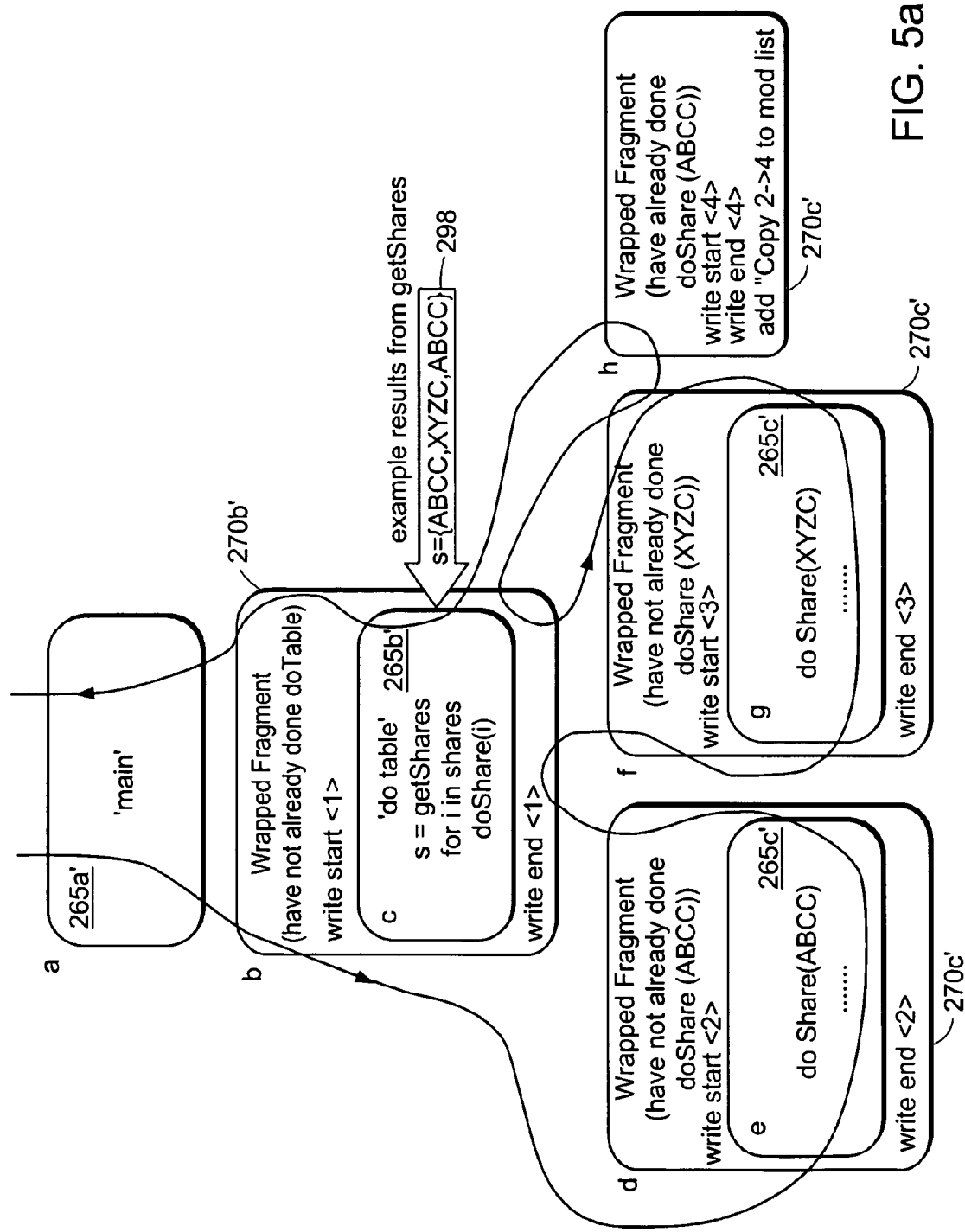
FIG. 5a is a block diagram of the execution sequence of augmented fragments of servlet page generation code according to the invention.
Figure 5B:
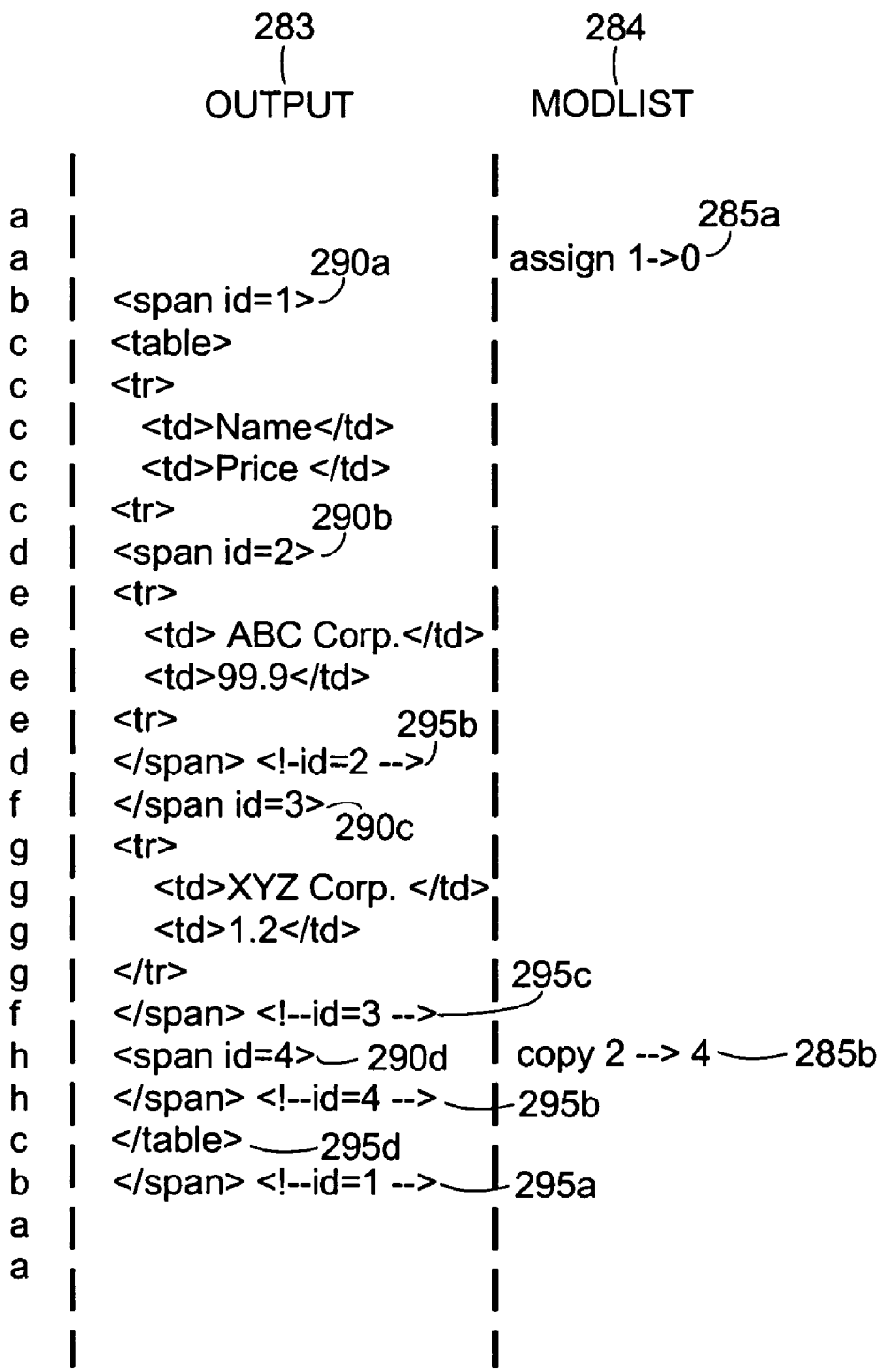
FIG. 5b is an exemplary output of HTML code for a generated page and the associated modification list, with identification tags identifying portions of the page according to the invention.

FIG. 5a illustrates the flow of execution (arrow 280) of the code fragments 265a′, 265b′, 265c′ and additional code 270b′, 270c′ by the partial page regenerator 250. FIG. 5b illustrates the items that the partial page regenerator 250 generates. The first generated item is the output 283 of page portions 260 of the page 240, which is shown as HTML code. The second generated item is the modification list ("mod list") 284. In one embodiment, the two items are generated concurrently. The letters to the left of the output 283 are not generated by the partial page regenerator 250, but rather are used to indicate the code fragment (wrapped or unwrapped) in FIG. 5a that generates that particular line of HTML code.

Following the flow of execution (arrow 280, FIG. 5a), first the 'main' code fragment 265a′ is executed. The 'main' code fragment 265a′ initially creates an empty page (e.g., no content in the body section of the HTML page) and uses an identification tag of "0" to identify the portion of the page 240 that contains modifiable page portions 260. The 'main' code fragment 265a′ also generates an assign command 285a in the modification list 284 that assigns the content of identification tag "1" to the portion with the identification tag "0" (e.g., refer to TABLE 1 below for description of assign command).

The 'main' code fragment 265a′ calls the 'do table' code fragment 265b′. Since the 'do table' code fragment 265b′ is wrapped with additional code 270b′, the additional code 270b′ intercepts the call and begins execution. The additional code 270b′ creates the identification tag "1" to identify the beginning of the portion of the page that the additional code 270b′ code fragment produces. The additional code 270b′ generates the HTML span tag 290a for the identification tag to establish the start of the page portion that the additional code 270b′ generates. The additional code 270b′ generates an end span tag 295a to identify the end of the page portion identified as "1", once the execution of addition code 270b′ is complete. Using the map of correspondences 300 (FIG. 7), the additional code 270b′ determines that the 'do table' code fragment 265b′ has not been executed yet and calls the 'do table' code fragment 265b′ of the page generation code 30′ for execution.

During execution of the instruction set (not shown) of the 'do table' code fragment 265b′ of the page generation code 30, the 'do table' code fragment 265b′ generates a <table> tag in the HTML output 283 and HTML code to generate a header row with table data cells "Name" and "Price". The 'do table' code fragment 265b′ receives input data 298 (e.g., ticker symbols for shares of stock) from the storage buffer 54.

In response to the input data 298, the 'do table' code fragment 265b′ calls the 'do Share' code fragment 265c′ of the page generation code 30′ for each ticker symbol in the input data 298. For the first piece of data "ABCC", the 'do table' code fragment 265b' calls the 'do Share' code fragment 265c'. Because the 'do Share' code fragment 265c' is wrapped with additional code 270c', the additional code 270c' intercepts the call and begins execution. The additional code 270c' creates the identification tag "2" to identify the beginning of the portion 260 of the page 240 that the additional code 270c' fragment produces the first time the 'do Share' code fragment 265c' is called with the piece of input data "ABCC".

The additional code 270c' generates the HTML span tag 290b to establish the start of the page portion that the additional code 270c' generates. The additional code 270c' determines that the 'do Share' code fragment 265c' has not been executed yet with the argument "ABCC" and calls the 'do Share' code fragment 265c' of the page generation code 30' for execution. During execution of the instruction set (not shown) of the 'do Share' code fragment 265c' of the page generation code 30, the 'do Share' code fragment 265c' generates a row in the table with table data cells "ABC Corp." and "99.9". Because the execution of the 'do Share' code fragment 265c' is complete, with respect to that page portion dealing with that piece of input data 298, the additional code 270c' generates an end span tag 295b in the HTML code to establish the end of the portion created by the additional code 270c' fragment. Execution returns back to the 'do table' code fragment 265b'.

For the next piece of data "XYZC", the 'do table' code fragment 265b' calls the 'do Share' code fragment 265c' again. Because the 'do Share' code fragment 265c' is wrapped with additional code 270c', the additional code 270c' intercepts the call and begins execution. The additional code 270c' creates the identification tag "3" to identify the beginning of the portion of the page that the additional code 270c' code fragment produces the first time 'do Share' code fragment 265c' is called with the piece of input data "XYZC". The additional code 270c' generates the HTML span tag 290c to establish the start of the page portion that the additional code 270c' generates. The additional code 270c' determines that the 'do Share' code fragment 265c' has not been executed yet with the argument "XYZC" and calls the 'do Share' code fragment 265c' for execution. During execution of the instruction set (not shown) of the 'do Share' code fragment 265c' of the page generation code 30 generates a row in the table with table data cells "XYZ Corp." and "1.2". Because the execution of the 'do Share' code fragment 265c' is complete, with respect to that page portion dealing with that piece of input data 298, the additional code 270c' generates an end span tag 295c to establish the end of the portion created by the additional code 270c' code fragment. Execution returns back to the 'do table' code fragment 265b'.

For the next piece of data "ABCC", the 'do table' code fragment 265b' calls the 'do Share' code fragment 265c'. Because the 'do Share' code fragment 265c' is wrapped with additional code 270c', the additional code 270c' intercepts the call and begins execution. The additional code 270c' creates the identification tag "4" to identify the beginning of the portion of the page that the additional code 270c' code fragment produces the second time 'do Share' code fragment 265c' is called with the piece of input data "ABCC". The additional code 270c' generates the HTML span tag 290d to establish the start of the page portion that the additional code 270c' generates. This time the additional code 270c' determines that the 'do Share' code fragment 265c' has been executed wit the argument "ABCC" and does not call the 'do Share' code fragment 265c' for execution. The 'do Share' code fragment 265c', if executed again, would generate a row in the table with table data cells "ABC Corp." and "99.9", identical to the portion in the identification tag "2".

Because the 'do Share' code fragment 265c' is not executed, the additional code 270c' generates an end span tag 295d to establish the ending of the portion created by the additional code 270c' code fragment. To generate the portion of the page that is required, the additional code 270c' generates a copy command 285b in the modification list 284 instructing the display alterer 245 of the client node 205 to copy the portion contained in identification tag "2" to the portion contained in identification tag "4" (e.g., refer to Table 1 for description of copy command). Execution returns back to the 'do table' code fragment 265b'.

With all the pieces of input data 298 processed, the execution of the 'do table' code fragment 265b' is completed. The additional code 270b' generates an end span tag 295a to establish the ending of the portion generated by the additional code 270b'. Execution returns back to the 'main' code fragment 265a' and from there to the runtime system, which transmits the page portions (e.g., the HTML output file) and the instructions for inserting the page portions (e.g., modification list) to the client node 205 via the server transceiver 235.

From the illustrative example of FIGS 5a and 5b, it is easy to see that when the page 240 is subsequently updated, for example, because the price of a share of XYZ Corp. increased, the execution and output can be further reduced. In one embodiment, for example, for a subsequent update only the row of the table that has changed is transmitted to the client node 205. In this embodiment the partial page regenerator 250 executes the 'do share' code fragment 265c', with its associated additional code 270c', using "XYZC" as the argument. The additional code 270c' creates the identification tag "5" to identify the beginning of the portion of the page that the additional code 270c' fragment produces the next time 'do Share' code fragment 265c' is called with "XYZC". The additional code 270b' generates an HTML span tag to establish the start of the page portion that the additional code 270b' generates. The additional code 270b' calls the 'do Share' code fragment 265c' for execution. The 'do Share' code fragment 265c' generates a row in the table with table data cells "XYZ Corp." and "2.5", the new price. Since the execution of the 'do Share' code fragment 265c' is complete, the additional code 270c' generates an end tag for span id=5 to establish the ending of the portion created by the additional code 270c' fragment.

The partial page regenerator 250 determines, using the map of correspondences 300 (FIG. 7), that the row with "XYZC" has identification tag "3". The partial page regenerator 250 determines that the rows of the table with ABC Corp. do not need to be updated because the price has not changed. The partial page regenerator 250 transmits the generated HTML output of the updated row and a modification list to the display alterer 245 of the client node 205 for incorporation into the currently displayed web page. The partial page regenerator 250 includes the command "Assign 5→3" in the transmitted modification list (e.g., refer to Table 1 for description of assign command). This command instructs the display alterer 245 to find the HTML output with the identification tag "3" and replace it with the newly transmitted HTML output portion with the identification tag "5".

1.3.5 Updating the Server Storage Buffer with Client Feedback

In the exemplary embodiment of FIG. 5a, the input data 298 originates from the client node 205. In this embodiment, the input data 298 is transmitted from the client node 205 after the client user has inputted the data into one or more user input fields of the transmitted page 240 and clicked on the submit button, update button and/or pressed the enter key. In another embodiment, the display alterer 245 of the client node 205 monitors the user input fields of the transmitted page 240. When the display alterer 245 has detected data in a user input field (e.g., the user entered data into a field and pressed the tab key or the user entered data and moved the cursor to another part of the page and clicked a mouse key), the display alterer 245 transmits the data to the partial page regenerator 250 with a page update request.

In yet another embodiment, the partial page regenerator 250 provides additional software (e.g., a method referred to as 'feedback') to the client node 205 that is part of the page 240 generated by the page generation code 30. When the additional software is called (e.g., by user action), the additional software arranges that its arguments are transmitted to the server node 210. The partial page regenerator 250 also provides additional software (e.g, a method, also called 'feedback') in the page generation code 30. The 'feedback' method on the server node 210 uses the arguments received by the client node 205 to update the data 50 in the storage buffer 54.

For example part of the page generated might be

<input type="text" onchange="feedback(value)">

This displays an input box, and includes a piece of custom code (feedback(value)) that is called whenever the user enters a value and presses tab, or moves the mouse. This will call the method 'feedback' on the client node 205 in response to this action, passing the value entered. The value is transmitted to the server node 210. The method called 'feedback' in the page generation code 30 on the server node 210 is called with this value as an argument. This might be (for example)

Void feedback(String stock)
{
portfolio.setCurrentStock(stock);
} where portfolio is a reference to a data access bean 100 (FIG. 4c).

In another embodiment, the calling of 'feedback' on the server node 210 causes the partial page regenerator 250 to immediately refresh the page 240, as the page 240 is most likely to have changed.

1.4 Map of Correspondences

The partial page regenerator 250 determines the identification tags 290 (e.g., HTML span tags) of the portions 260 of the page 240 and whether data 50 for any of those page portions 260 has changed because the partial page regenerator 250 generates a map of correspondences 300 (FIG. 7) as the partial page regenerator 250 creates the page portions 260 which stores such information. Within the map of correspondences 300 is a page description model 303 (FIG. 6) that models the layout relationship of the portions of the page.

1.4.1 Map of Correspondences—Page Description Model

Figure 6:
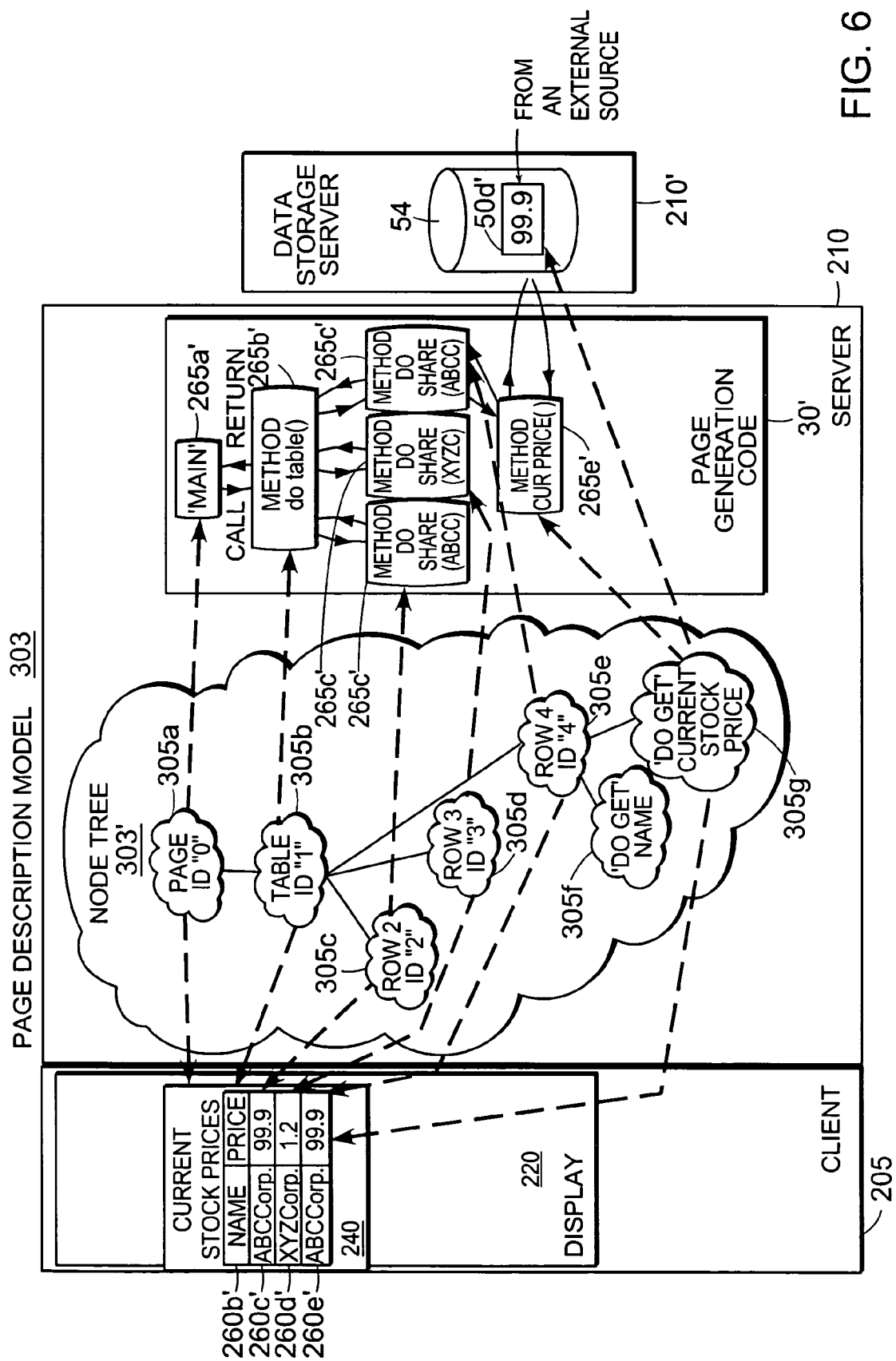
FIG. 6 is a block diagram of a page description model and correspondences between fragments of page generation code and portions of the generated page according to the invention.

FIG. 6 shows an exemplary embodiment of the logical connections that are modeled by the page description model 303. Using the same illustrative example as described for FIGS. 5a and 5b, the page description model 303 includes a node tree 303' having nodes 305a, 305b, 305c, 305d, 305e, 305f and 305g (generally 305). The relationship (i.e., page description model 303) of the page portions 260 is shown as a node tree 303'. In other embodiments, other models can be used. Different embodiments of the invention can create and operate at different levels of the node tree 303'. In other words, some updates will deal only with children nodes, while others will use parent nodes to effect an update at a child node. The smaller the amount of data that is generated and transmitted to update a page 240, the less resources that are needed to effect the update.

Each node 305 of the node tree 303' has an ID that is unique with respect to each of the other nodes 305 of the node tree 303' and identical with respect to the identification tags (e.g., span tag) inserted into the HTML output 283 sent to the client node 205. In another embodiment, if the node ID is different from the inserted identification tag, the map of correspondences 300 contains the relationship between the model node 305 representing the portion 260 of the page 240 and the actual identification tags (e.g., span tag) of the HTML code sent to the client node 205 to generate the display of the page portion. To create the page description model 303, the map of correspondences 300 include correspondences between the code fragment 265 of the page generation code 30 and the portions 260 of the page each of the code fragments 265 create. The map of correspondences 300 also includes correspondences between the code fragments 265 of the page generation code 30 and the data 50 on which each of the code fragments 265 depend.

1.4.2 Map of Correspondences—Data Structure

Figure 7:
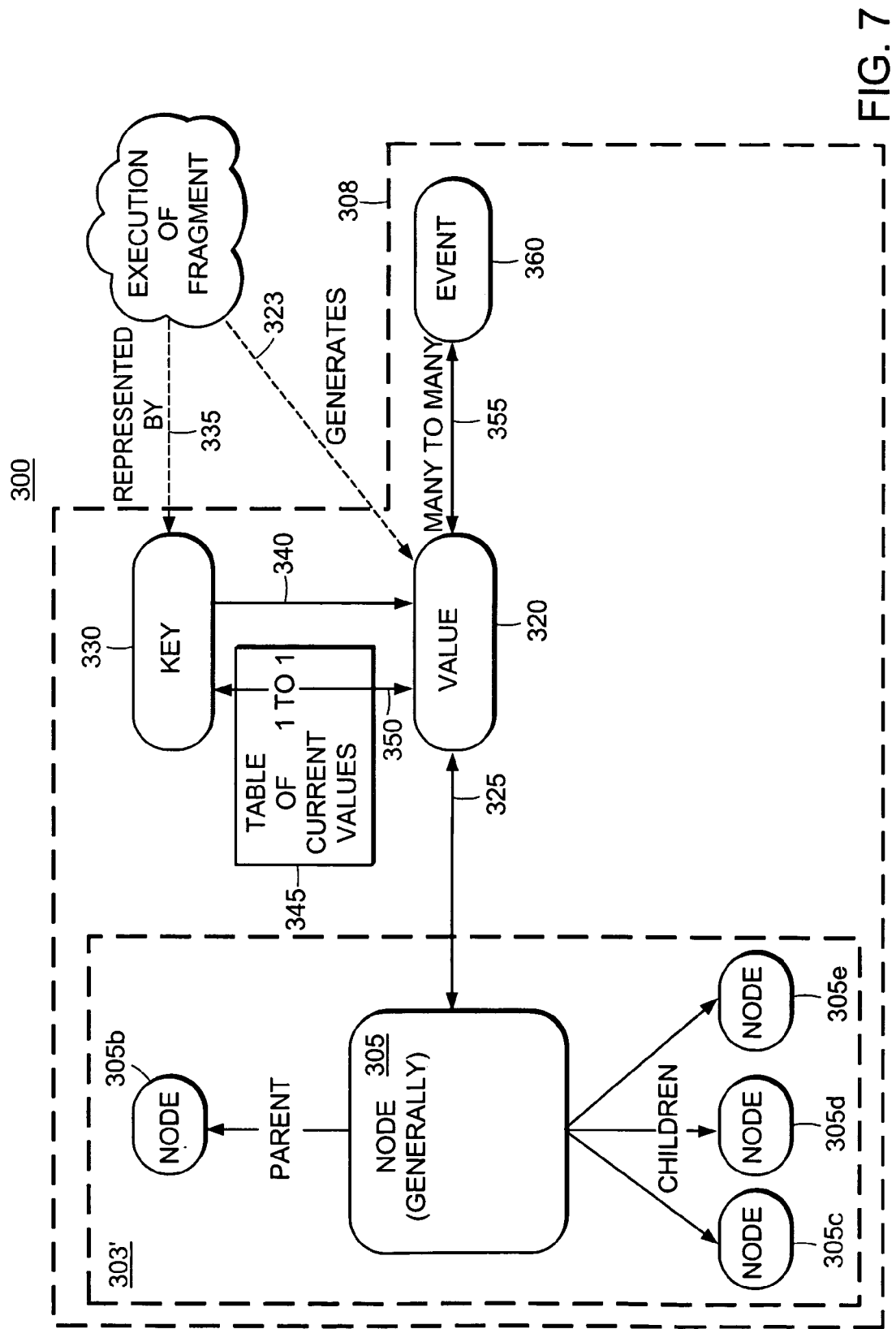
FIG. 7 is a block diagram of an example of the generic data structure for a map of correspondences between fragments, data, and page portions according to the invention.

FIG. 7 illustrates an example of a general data structure 308 for the map of correspondences 300. The data structure 308 includes a node tree 303', a value field 320, a key field 330, a table of current values 345 and an event field 360. The value field 320 represents a portion 260 of the page 240 that the execution of a code fragment 265 generates (arrow 323). In one embodiment, the data in the value field 320 is the HTML output 283 that is used to generate that portion 260 of the page 240 on the display 220 of the client node 205. In another embodiment, there is no need to store the HTML output itself, other than temporarily in the modification list and work list. The value field 320 has no data, but is just an association of a number of other fields.

The value field 320 can be used to create one or more nodes 305. The map of correspondences 300 maps (arrow 325) the value field 320 to those nodes 305 in the node tree 303' that corresponded to that specific value field 320.

The key field 330 represents (arrow 335) the execution of a code fragment 265. The key field 330 includes the data necessary to re-execute a code fragment 265 to generate the value 320 to which the key corresponds (arrow 340). A single key field 330 can have multiple correspondences (arrow 340) because, as the code fragment 265 of the key 330 is re-executed, subsequent to a change in the data 50 upon which the code fragment 265 depends, a new value 320 is created. At all times however, there is only one current value 320 for that particular key 330.

The current value 320 generated by a key 330 is stored in the table of current values 345. In the table of current values 345, the correspondence (arrow 350) of the key field 330 to the value field 320 is always one to one, if the key 330 is represented. In other words, some keys 330 may not be represented in the table of current values 345, but if the key 330 is in the table of current values 345, there is at most one value 320 for that key 330. The table of current values 345 tracks the key field 330 with a specific argument so that there is only one current value field 320 created (e.g., one criterion of a code fragment is that it always produces the same output (i.e., value field 320) with the same arguments and data 50).

The map of correspondences 300 maps (arrow 355) value fields 320 to event fields 360. The event field 360 contains data about events that affect the value fields 320 to which they are mapped (arrow 355). In a generic sense, a mapped event 360 is simply a notion that a value 320 depends on a piece of data 50 and is used as one means for translating between a notification that 'something' has changed and identifying which values 320 are now invalid.

For example, reference to events that indicate a change of the data 50 on which the value field 320 depends can be stored in the event field 360. With this correspondence (arrow 355), when the data 50 changes, or an event is generated representing a change in the data 50, the partial page regenerator 250 determines that those nodes 305, which are mapped (arrow 325) to the value field 320 mapped (arrow 355) to the event 360 representing the changed data 50, are no longer valid and must be updated. The generation and monitoring of these types of data 50 change events 360 are well known in the art and any generating and monitoring technique is acceptable.

1.4.3 Map of Correspondences—Examples Using FIGS. 5a and 5b

Figure 8:
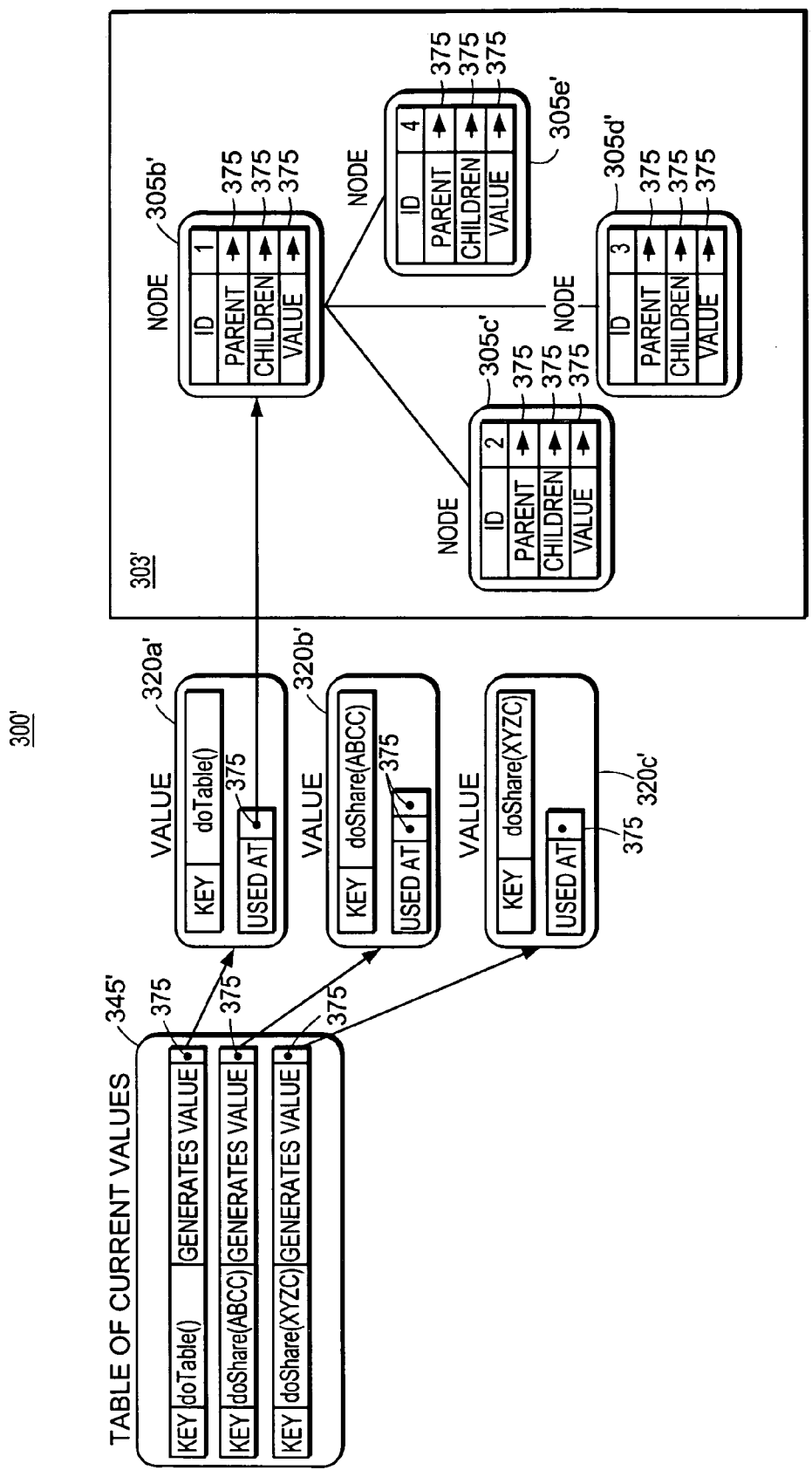
FIG. 8 is a block diagram of an example of a map of correspondences between fragments, data, and page portions according to the invention.

FIG. 8 illustrates an exemplary embodiment of the map of correspondences 300' that the partial page regenerator 250 creates by performing the selective execution example of FIGS. 5a and 5b. The table of current values 345' includes the correspondence of one key to one value 320'. The keys of the table of current values 345' represent the code fragments 265 with specific arguments. The table 345' includes a pointer 375 to the unique value 320' that the key 330 generates. As shown, there are three unique values 320', corresponding to three unique page portions 260 (represented by nodes 305b', 305c' and 305d'), that are created in the example. Each value 320' has a pointer 375 to one or more nodes 305' (i.e., all page portions) of the page description model node tree 303'. Each node 305 contains data, or pointers 375 to the data, including the identification tag ("ID") of that particular node, the IDs of parent and children nodes and the value 320' that generated the corresponding node 305'.

1.5 Instructions for Incorporation of Page Portions

As shown in FIG. 5b, the partial page regenerator 250 generates a modification list 284 along with the actual output 283 that is used to generate a portion 260 of the page 240 on the display 220 of the client node 205. The server node 210 transmits the portions 260 of the page 240 that have been modified, along with the modification list for those particular portions 260, to the client node 205. The client node 205 uses the modification list to display the transmitted portions 260 in the appropriate area of the page 240. The display alterer 245 performs the task of incorporating the transmitted page portion 260, using the modification list.

To incorporate the transmitted page portion(s) into the displayed page 240, the display alterer 245 must be able to process the commands that are on the modification list. The partial page regenerator 250 determines the capability of the display alterer 245. In one embodiment, the display alterer 245 of the client node 205 is part of the client software. In this embodiment, the client node 205 can inform the server node 210 which commands the display alterer 245 can understand during the initial request.

In another embodiment, the display alterer 245 of the client node 205 is a piece of script added to the page 240 dynamically by the server transceiver 235 when the page 240 is first sent to the client node 205. An example of the linking of a script client to a page is described in Appendix 1.

In this embodiment, the client node 205 informs the server node 210 what 'type' of browser the client node 205 is running as part of the initial request, and the server node 210 can then lookup the capabilities in a table of known browsers stored on the server node 210. (For example, the client browser may identify itself as being Internet Explorer 5.0). In yet another embodiment, the server transceiver 235 sends the client browser different versions of the display alterer 245 and/or client transceiver 230, depending on the type of the client browser.

1.5.1 Command Examples

The modification list uses commands from a predetermined set of commands. For one embodiment, Table 1 lists an example of a set of four types of commands that can appear in the modification list. The first column of Table 1 lists the name of the command. The second column of Table 1 lists the parameters that can be included with each command. The third column of Table 1 lists a general description of each command. The term "node" refers to the nodes 305 of the page description model node tree 303' in the map of correspondences 300. The command parameter uses the identification tag (i.e., ID) to represent the node 305. For example, if the node 305 was a table data cell of the price of the stock and the price changed to 120, the command might be Assign(8, "$120"). The display alterer 245 would insert the value of "$120" in the table data cell with the identification tag "8".

TABLE 1

| Command | Parameters | General Description |
| --- | --- | --- |
| Assign | dest node, output (e.g., literal html) | Insert the specified HTML at the specified point (node) in the page. |
| CopyNode | dest node, src node | Copy all children of 'src' to 'dest' in the page. |
| MoveNode | dest node, src node | Move all children of 'src' to 'dest' in the page. |
| CopyValue | dest node, value | Copy the specified value into 'dest' in the page. (If the display alterer 245 has no notion of 'values' this command is converted to a 'MoveNode' or 'CopyNode' or 'Assign' command prior to transmission.) |

1.6 Updating Page When Data Changes

When an event 360 is detected that represents a change in data 50, the partial page regenerator 250 adds the value 320 that corresponds (arrow 355, FIG. 7) to the event 360 on an invalid value list (not shown). In one embodiment, the invalid value list is part of the map of correspondences 300. The invalid value list tracks all values currently displayed on the page 240 on the client node 205 that have changed and are no longer valid. Once there is an entry on the invalid value list, the partial page regenerator 250 waits for a request to refresh the page 240 and, in response to that request, generates and transmits updates for the changed portions 260 of the page 240.

The request to refresh the page 240 can be generated in many different ways. For example, the user on the client node 205 may request a refresh of the page 240. In another embodiment, the display alterer 245 may request a refresh of the page 240 periodically. In another embodiment, the partial page regenerator 250 generates the request for a refresh once a change in data 50 is detected. For example, as stated above, when the 'feedback' method is called on the server node 210, the partial page regenerator 250 automatically generates a request for a refresh. In another embodiment, the communication protocol between the client node 205 and the server node 210 support or simulate a server push model (i.e., server node 210 transmitting data to the client node 205 without the client node 205 initiating a request).

1.6.1 Generating Updates for Portions of the Transmitted Page

Figure 9:
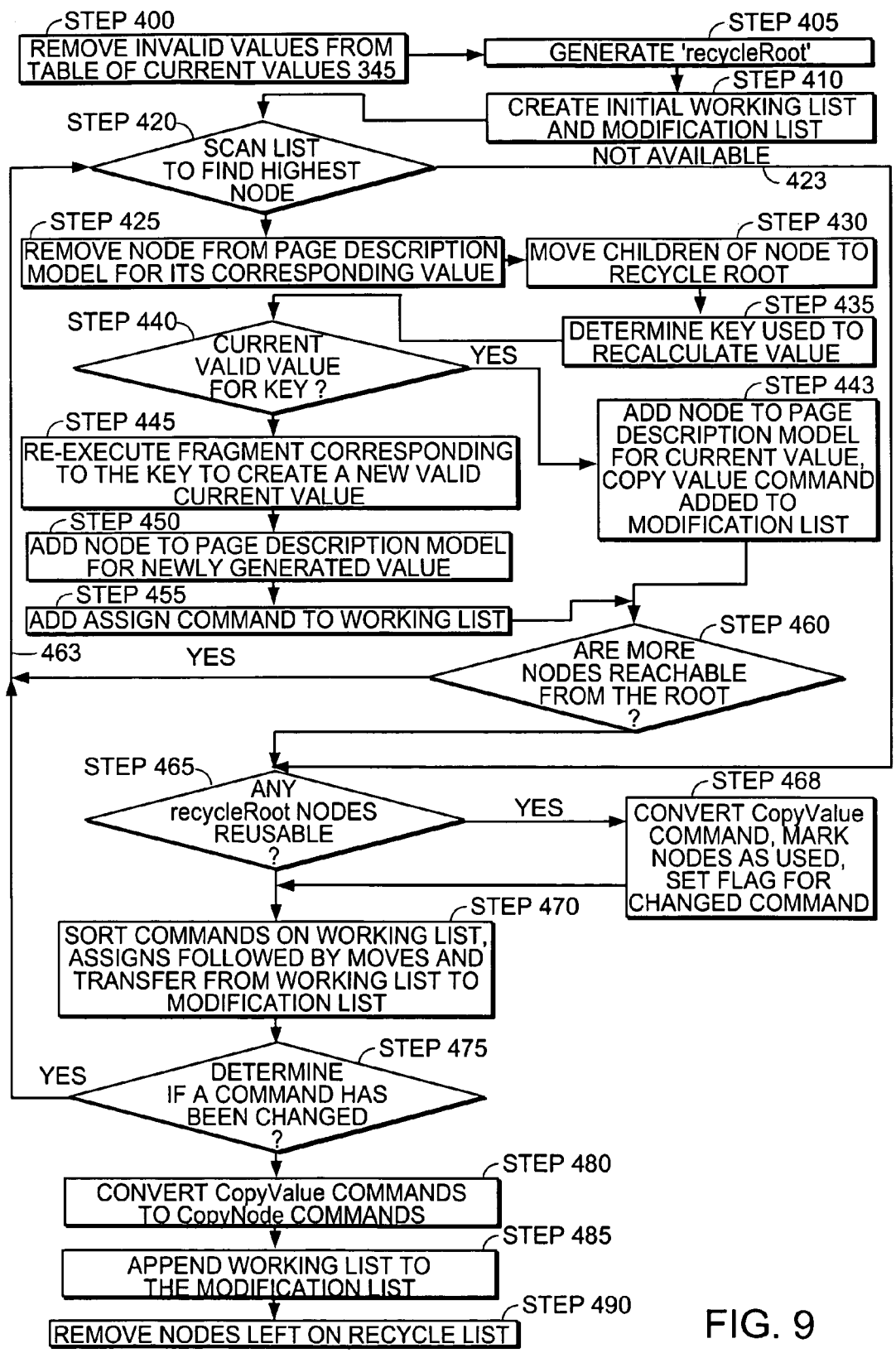
FIG. 9 is a flow diagram of an example of generating a modification list when data changes according to the invention.

FIG. 9 illustrates an exemplary process by which the partial page regenerator 250 generates updates for portions 260 of the page 240 that have changed. The partial page regenerator 250 generates output for the changed page portions 260 and a modification list for instructing the display alterer 245 on how to incorporate the changed page portions 260 in the displayed page. This exemplary process minimizes the amount of data that is transmitted to the client node 205, by taking advantage of any unchanged portions currently available on the client node 205.

To start the exemplary process, the partial page regenerator 250 examines the invalid value list and removes all values 320 (FIG. 7) on the invalid value list (step 400) from the table of current values 345 (FIG. 7), as they represent invalid values. The partial page regenerator 250 generates (step 405) a 'recycleRoot' node. This 'recycleRoot' node is a temporary place used to store nodes 305 that might be reused later. The partial page regenerator 250 creates (step 410) two initially empty lists of commands, a working list and the modification list. The partial page regenerator 250 generates the working list, and moves groups of items from the working list to the modification list. The commands used in this example are the same as those commands shown in Table 1.

The partial page regenerator 250 scans (step 420) the invalid value list to find the highest node that corresponds to one of the values 320 on the invalid value list. (The highest node as the node closest to the root of the node tree 303'.) If there are no such nodes, then the exemplary process jumps (arrow 423) to step 465. The partial page regenerator 250 removes (step 425) the highest node from the page description model node tree 303' for the corresponding invalid value. The children nodes 305 of the highest node are moved (step 430) to the recycleRoot, as they may not themselves be invalid, and may be used later. The partial page regenerator 250 determines (step 435) the key 330 (FIG. 7) used to recalculate the corresponding value of the highest node, using the map of correspondences 300. For example, using FIG. 7, the partial page regenerator 250 follows the node 305, which corresponds (arrow 325) to a value 320, which corresponds (arrow 340) to a key 330.

Once the key 330 is determined (step 435), the partial page regenerator 250 determines whether there is a current value (i.e., a value 320 in the current value table 345) for the corresponding key 330. If there is a current value for this key 330, then recalculation (step 445) has already taken place for this key 330 on a previous iteration of the loop (arrow 463). If recalculation (step 445) has already taken place, the partial page regenerator 250 adds (step 443) the node 305 to the page description model node tree 303' for the corresponding current value and adds (step 443) a 'Copy Value' command to the working list. If recalculation (step 445) has already taken place, the exemplary process jumps (arrow 458) to step 460.

If recalculation (step 445) has not already taken place, the partial page regenerator 250 re-executes (step 445) the code fragment 265 associated with the determined key 330 (step 435) to generate a new value. The generated output is saved to an output file (e.g., the HTML output code 283 in FIG. 5b) with an identification tag. The node is added (step 450) to the page description model node tree 303' for the newly generated value. Then the partial page regenerator 250 adds (step 455) an 'Assign' command, using the identification tag, to the working list.

During re-execution (step 445), the code fragment 265 associated with the determined key (step 435) may call other code fragments (e.g., FIG. 5a, the 'do table' code fragment calls the 'do Share' code fragment). For each call that has parameters matching a value 320 in the current value table 345, the partial page regenerator 250, via the additional code 270, intercepts the call. The interception is similar to the example of the execution of 'do Share (ABCC) for the second time in FIGS. 5a and 5b. Upon interception, the partial page regenerator 250 generates an empty page portion with an identification tags (e.g., span ID "4", 290d and 295d in FIG. 5b) and generates a 'CopyValue' command, which is added to the working list.

The partial page regenerator 250 examines the invalid value list to determine (step 460) whether there are more nodes reachable from the root. If there are more nodes, the process loops (arrow 463) back to step 420. If there are not any more nodes, the process continues with step 465.

The partial page regenerator 250 examines the nodes under the recycle root to determine (step 465) whether any nodes can be reused. As these nodes each represent portions 260 of a page available on the client node 205, it is highly beneficial to reuse these. The portions 260 can be reused if they match 'CopyValue' commands on the working list. If a node under the recycleRoot can be reused, the partial page regenerator 250 converts (step 468) the matching 'Copy-Value' command to a 'MoveNode' command, with the source node parameter set to the matching node. The parents and children of the reused node are marked (step 468) as used as they may not also be recycled. The partial page regenerator 250 sets (step 468) a flag to indicate that at least one command in the working list has changed.

The partial page regenerator 250 continues by sorting (step 470) the commands in the working list, placing the 'Assign' commands first, followed by the 'MoveNode' commands. The partial page regenerator 250 removes (step 470) the 'Assign' commands and the 'MoveNode' commands from the working list and appends them to the modification list, ready for transmission to the client node 205. Remaining 'CopyValue' commands are left on the working list.

The partial page regenerator 250 determines (step 475) whether any commands have been changed, by checking to see if a flag was set (step 468). This determination is made because if at least one command has been changed, then it is possible that a previously unreachable node is now reachable. If the flag was set (step 468), the exemplary process loops (arrow 463) back to step 420.

When no more nodes can be recycled, the partial page regenerator 250 converts (step 480) all remaining 'Copy-Value' commands to 'CopyNode' commands. These are less efficient than a 'MoveNode' command, but still better than separate 'Assign commands. The source for a 'CopyNode' command is any node that has the correct value. When converting a 'CopyValue' command, the set of nodes related to the value is examined and one node is selected. The only requirement is that this node is one that will be available on the client at the time that the 'CopyNode' command is executed. The requirement can be satisfied by selecting the node with the lowest identification tag as the source node when converting the 'CopyValue' commands, in both step 468 and step 480.

During this conversion, the partial page regenerator 250 renames the copied sub-tree so that the resulting sub-tree contains nodes with unique identifiers. Any means may be used for renaming (e.g., pre-order depth first traversal). The partial page regenerator 250 appends (step 485) the working list, which now contains only 'CopyNode' commands, to the modification list.

In one example, the modification list 284 includes a number of sections. All but the final two sections contained one or more 'Assign commands' followed by one or more 'MoveNode' commands. The penultimate section contains one or more 'Assign' commands followed by zero or more 'MoveNode' commands, and the final section contains zero or more CopyNode commands (e.g., AAM AAAMMM AAA CCC, where A='Assign' command, M='MoveNode' command, C='CopyNode' command and the spaces divide each section).

Then, the partial page regenerator 250 removes (step 490) all nodes left on the recycle list from the page description model node tree 303' for their corresponding values 320. If the value 320 has no remaining corresponding nodes 305 in the page description model node tree 303', then the value 320 is discarded and removed from the current values table 345. The partial page regenerator 250 also removes any event records 360 and keys 330 associated with the discarded values 320. This reflects the commands that will take place on the client node 205.

1.7 Incorporating Updated Portions into the Transmitted Page

Once the output 283 and the modification list 284 have been created, the partial page regenerator 250 transmits the two items through the server transceiver 235, over the network communication channel 215, through the client transceiver 230 to the display alterer 245. The display alterer 245 incorporates the output 283 using the modification list 284.

1.7.1 Using the Modification List

Figure 10:
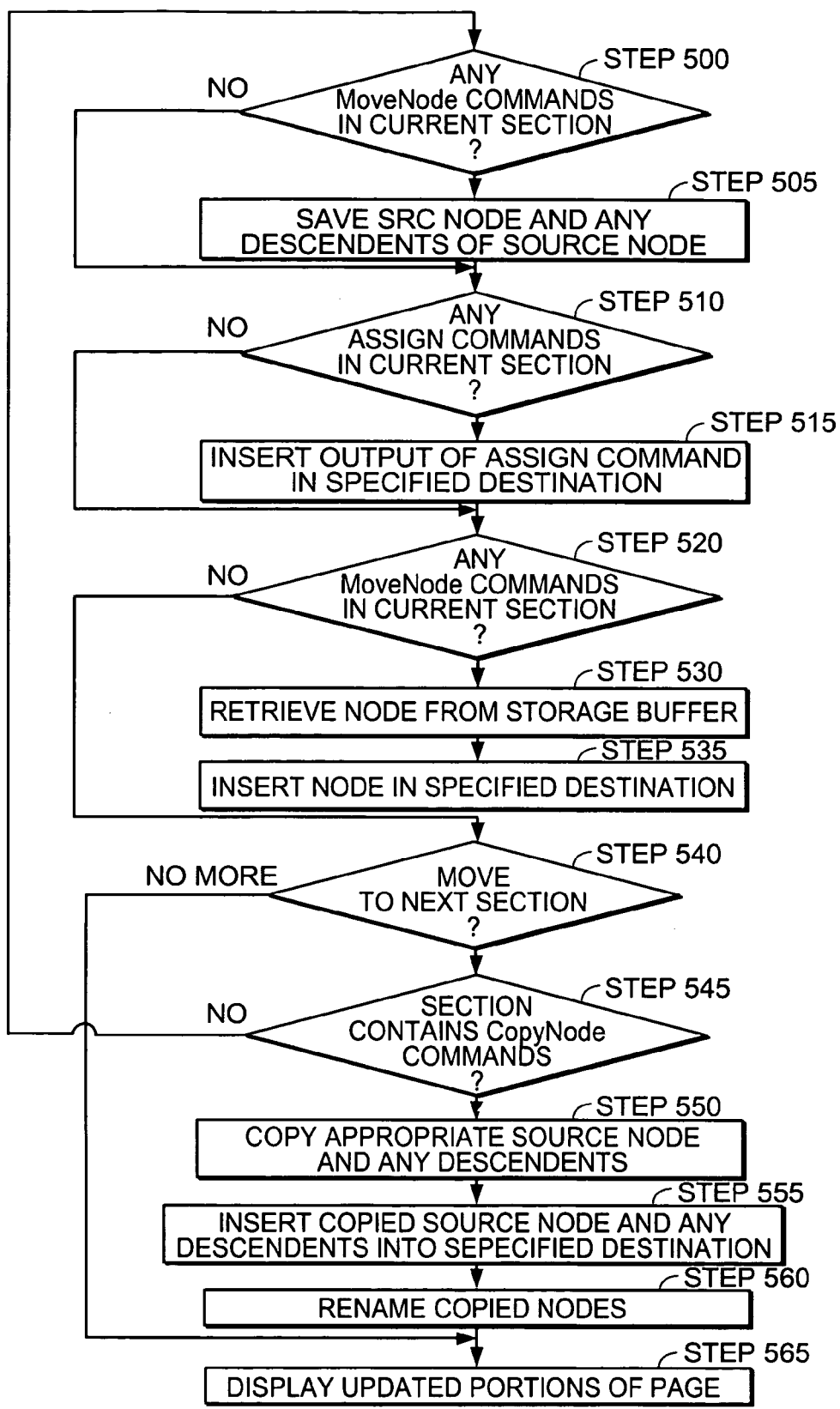
FIG. 10 is a flow diagram of an example of incorporating updates using the modification list according to the invention.

FIG. 10 illustrates an exemplary embodiment of a process by which the display alterer 245 incorporates the updates for portions 260 of the page 240 that have changed, using the modification list 284 that the server node 210 transmitted along with the updated page portions 260. As described above, the modification list 284 consists of a number of sections containing Assign and MoveNode commands, and an optional final section containing only CopyNode commands. The display alterer 245 processes each section of the modification list 284 in turn. The display alterer 245 examines (step 500) the current section of the modification list 284 for 'MoveNode' commands. For each 'MoveNode' command, the display alterer 245 saves (step 505) the source node of the 'MoveNode' command, and any descendent nodes, in the storage buffer 225. The display alterer 245 then examines the current selection of the modification list 284 for 'Assign' commands (step 510). For each 'Assign' command, the display alterer 245 inserts (step 515) the output (e.g., displayable portion 260, actual HTML code) of the 'Assign' command into the portion 260 of the page 240 specified by the destination node of the 'Assign' command.

The display alterer 245 reexamines (step 520) the current section of the modification list 284 for 'MoveNode' commands. For each 'MoveNode' command, the display alterer 245 retrieves (step 530) the appropriate source node temporarily saved (step 505) in the storage buffer 225. The display alterer 245 inserts (step 535) the value of the node, and any descendants, into the portion 260 of the page 240 specified by the destination node of the 'MoveNode' command.

The display alterer 245 moves (step 540) to the next section in the modification list 284. If there are no more sections, the process continues at step 565. If the new section does not contain only 'CopyNode' commands, the process continues to step 500.

The display alterer 245 examines (step 550) the current section of the modification list 284 for 'CopyNode' commands. For each 'CopyNode' command, the display alterer 245 copies (step 555) the appropriate source node, and any descendants. The display alterer 245 inserts (step 555) the output of the copied node, and any descendants, into the portion 260 of the page 240 specified by the destination node of the 'CopyNode' command. During this copy process, the display alterer 245 renames (step 560) all of the embedded node identification tags of the copied nodes. In one embodiment, the display alterer 245 performs all of the incorporation on the HTML code (e.g., a copy of the HTML code of the currently displayed page 240 in the storage buffer 225) and when incorporation of all of the updates is complete, the display alterer 245 displays (step 565) the updated page. In another embodiment, the display alterer 245 displays (step 550) each update as that update is incorporated into the displayed page 240.

1.7.2 An Example of Incorporation

FIGS. 11a, 11b, 11c and 11d illustrate an example of the display alterer 245 incorporating an update into the displayed page 240. In the illustrated example, the portion 260 of the page 240 that the display alterer 245 is updating a table, identified as the node with the identification tag "1". The table (i.e., node "1") is being updated by adding a new element (i.e., child node with the value "Gamma") to the table.

Figures 11A, 11B, 11C, 11D:
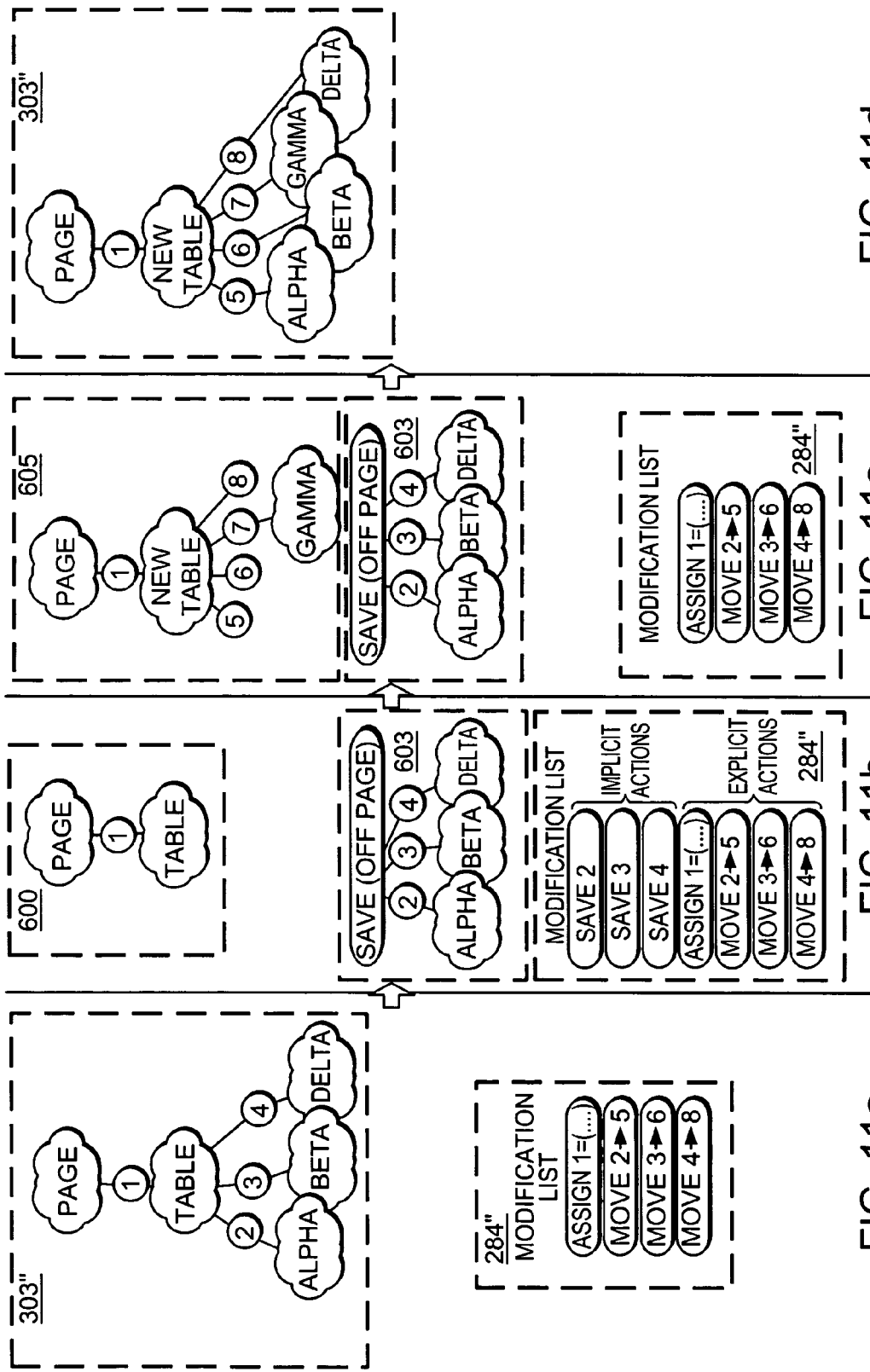
FIGS. 11a, 11b, 11c and 11d are block diagrams of an example of a process for inserting of a new page portion into a currently displayed page according to the invention.

FIG. 11a illustrates a page description model node tree 303" representing the transmitted page 240 prior to the update. Similar to the example in FIGS. 5a and 5b, the node tree 303" includes a parent node "1" with three children nodes "2", "3", and "4". The child node "2" has a value of "Alpha". The child node "3" has a value of "Beta". The child node "4" has a value of "Delta". FIG. 11a also illustrates the modification list 284″ that the partial page regenerator 250 transmitted to the display alterer 245.

The display alterer 245 uses the modification list 284″ to incorporate the changes, following the exemplary process of FIG. 10. The display alterer 245 examines (step 500) the modification list 284″ and finds an 'Assign' command. The display alterer 245 also determines (step 500) that there are 'MoveNode' commands associated with the descendants (i.e., child nodes) of the 'Assign' command destination node (i.e., node "1"). As shown if FIG. 11*b*, the modification list 284‴ includes implicit actions of saving (step 505) the reusable nodes 603 in the storage buffer 225. Because there is an 'Assign' command for the table, the display alterer 246 removes the descendants of that node to start creating a working version 600 of the page description model node tree 303″.

Referring to FIG. 11*c*, the display alterer 245 inserts (step 515) the output as defined in the 'Assign' command. In this example, the output of the 'Assign' command, though not shown in the modification list 284″, is shown in the working version 605 of the page description model node tree 303″. Per the 'Assign' command, the new node "1" includes four descendent nodes with the identification tags "5", "6", "7" and "8". The descendent nodes with the identification tags "5", "6" and "8" are empty. The descendent node with the identification tag "7" has the value "Gamma".

The display alterer 245 continues by examining (step 520) the modification list 284″ for any 'MoveNode' commands. As shown in FIG. 11*c*, there are three move commands. For each 'MoveNode' command, the display alterer 245 retrieves (step 530) the nodes identified as the source node (i.e, 2,3,4) and inserts (step 535) the values (i.e., Alpha, Beta, Delta) into the destination nodes (i.e., 5,6,8). FIG. 11*d* illustrates the page description model node tree 303‴ of the updated page 240, now displayed (step 565) on the display 220 of the client node 205.

Figure 12:
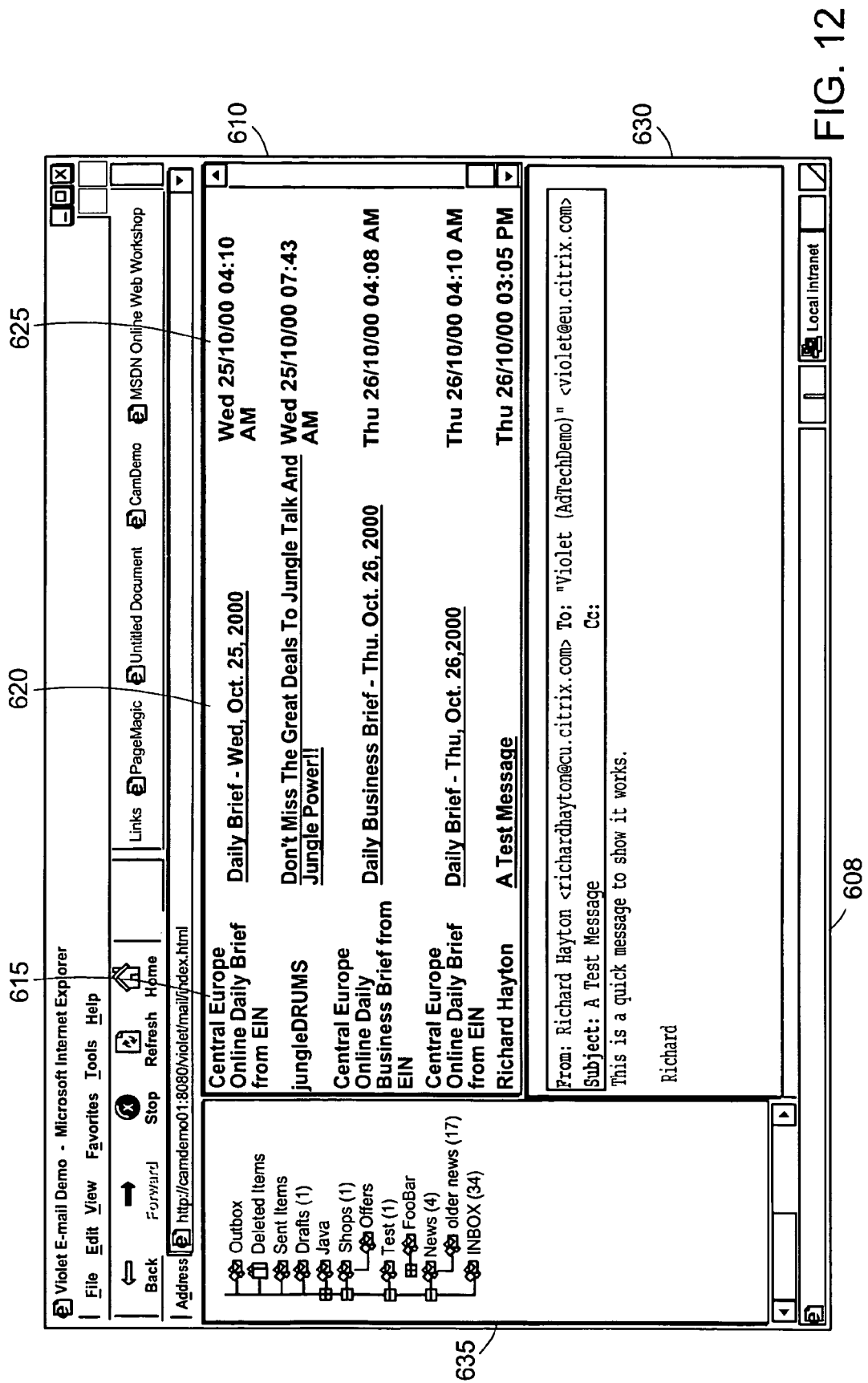
FIG. 12 is a screenshot of an example of incorporating updates into an email page according to the invention.

Although a table of stock prices has been used throughout this description, this invention works equally well with any other kind of content. For example, FIG. 12 is a screenshot of an example of an email page 608 being displayed to a user at the client node 205. A page generation code (not shown) might display a list 610 of messages in an 'inbox' for a particular user. For each message the sender 615, subject 620 and data 625 are shown, together with an indication (not shown) as to whether the message had been read (e.g., displayed in bold). This list 610 also contains links so that if a message were selected, then it would be displayed in full 630. With an embodiment of the partial page regenerator, the displayed list 610 of messages is updated in a number of ways

- When a new message arrives, the message is appended to the list 610, in a similar way "Gamma" was added in FIG. 11, but at the end of the list 610.
- The list 610 is sorted easily by rearranging the children nodes per the sorting criterion.
- When a message is read, its entry in the list 610 is modified to reflect this.

The partial page regenerator, to create such a list 610 of messages, would probably mimic the stock price example in structure. The partial page regenerator determines the number of messages, and then executes a loop, outputting a page portion (e.g., html) for each message.

Such an email application might be augmented by a more complex interface, for example listing available folders containing email in a 'tree structure' 635. The partial page regenerator creates this structure 635 by executing one fragment for each 'folder', and either displays a closed folder, or displays an open folder and then recursively calls the same fragment to display the contents of the folders. If the generated output contains 'onClick' events for each folder that inform the server node 210 when a folder is selected (ie opened or closed), then the page 608 is automatically updated to show the new state of a folder after a user selected it.

EQUIVALENTS

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims and therefore intended to be embraced therein.

APPENDIX 1

A worked example of adding a player to an HTML page that can then retrieve and display updates to the page. This demonstration will work with Internet Explorer 5.0

Here is an original page, which has been augmented with a client player (Transceiver 230 and Display Alterer 245). This is shown in gray and labeled u1. The page has also been modified to get updates immediately that it is loaded (this is a simplification). This is shown in grey and labeled u2.

```
Page.html
<HTML>
<head>

<script src = "player.js"></script>U1

</head>

<BODY   onload = 'getUpdates("updates.html")' >U2

<span id=1>Alpha</span><br>
<span id=2>Beta </span><br>
<span id=3>Gamma</span><br>
<span id=4>Delta</span><br>
</body>
</HTML>
```

The following code is the contents of 'player.js' that is added to the original page. This is a much simplified client player (Transceiver 230 and Display Alterer 245) which can perform only simple 'ASSIGN' operations. The operation of this is as follows.

When updates are requested, the location of a page containing updates, or server generating a page containing updates is supplied as a uniform resource locator (URL). This is passed to the 'getUpdates' function. This function creates a hidden subpage (frame) that is used as a communications channel to the server.

When the server receives the URL request, it responds by supplying a set of updates encoded as a HTML page (example given later). When loaded, this page of updates calls the 'doUpdate' method which in turn applies the update to the original page.

--- player.js

```
// retrieve a page containing updates from the specified URL
// once this has loaded 'doUpdate' will be called
function getUpdates(url)
{
   document.body.insertAdjacentHTML("afterBegin", "<IFRAME
NAME=__tunnel ID=__tunnel FRAMEBORDER=0 WIDTH=0
HEIGHT=0 STYLE='position:absolute' SRC='"+url+"'>
</IFRAME>");
}
// called when updates are available
// Perform the update on the current page.
function doUpdate(command,destId,data)
{
   if(command=='assign')
   {
      var dest = document.getElementById(destId);
      dest.innerHTML = data;
   }
   else
   {
      alert("Command "+command+" not understood");
   }
}
```

---

The following is an example page of updates. This page would normally be created dynamically by the Server Node (210).

--- updates.html

```
// This page contains the following updates, encoded as a HTML page
<html>
<head>
<script>
// parent is the containing window (ie the original page)
parent.doUpdate('assign',1,"A");
parent.doUpdate('assign',3,"C");
</script>
</head>
<body> </body>
</html>
```

---

What is claimed is:

1. A method for incorporating a dynamic portion of a transmitted page into a previous version of the transmitted page displayed on a client, the method comprising:
    (a) receiving, at a client, a transmitted page comprising a plurality of dynamic portions;
    (b) displaying the transmitted page on the client;
    (c) receiving, by the client, a modified version of one of the dynamic portions of the page and an identifier specifying one of the plurality of dynamic portions of the transmitted page to be replaced by the modified version of one of the dynamic portions; and
    (d) incorporating, by the client, the modified version of one of the dynamic portions into the transmitted page displayed on the client responsive to the modification list.

2. The method of claim 1 further comprising receiving, by the client, additional code instructing the client regarding interpretation of the modification list.

3. The method of claim 1 further comprising:
    (e) copying a first portion of the transmitted page displayed on the client; and
    (f) inserting the copied first portion into a second portion of the transmitted page displayed on the client.

4. The method of claim 3 further comprising changing an identification tag associated with the second portion from a first value associated with the copied first portion to a non-identical second value associated with the second portion.

5. The method of claim 1 further comprising moving a first portion of the transmitted page to a second portion.

6. The method of claim 5 wherein the step of moving further comprises saving the first portion in a storage buffer.

7. The method of claim 5 wherein the step of moving further comprises moving the first portion of the transmitted page to a second portion within the modified portion.

8. The method of claim 5 further comprising changing an identification tag associated with the moved portion from a first value associated with the first portion to a non-identical second value associated with the moved second portion.

9. The method of claim 1 wherein step (d) further comprises replacing one of the plurality of dynamic portions comprising the transmitted page with the received, modified portion.

10. A client for incorporating a dynamic portion of a transmitted page into a previous version of the transmitted page displayed on the client comprising:
    a transceiver receiving a transmitted page and a plurality of dynamic portions included in the transmitted page; and
    a display alterer in communication with the transceiver, the display alterer receiving a modified version of one of the dynamic portions of the page and an identifier specifying one of the plurality of dynamic portions of the transmitted page to be replaced by the modified version of one of the dynamic portions and incorporating the modified version of one of the dynamic portions into the transmitted page displayed on the client responsive to the modification list.

11. The client of claim 10 wherein the display alterer receives additional code instructing the client regarding interpretation of the modification list.

12. The client of claim 10 further comprising a storage buffer in communication with the display alterer, the storage buffer storing a first portion of the transmitted page displayed on the client for use in updating the transmitted page.

13. A system for incorporating a dynamic portion of a transmitted page responsive to the modification list, the system comprising:
    an external page code source;
    a client comprising:
        a client transceiver, the client transceiver receiving a transmitted page and a plurality of dynamic portions included in the transmitted page; and
        a display alterer in communication with the client transceiver, the display alterer receiving a modified version of one of the dynamic portions of the page and an identifier specifying one of the plurality of dynamic portions of the transmitted page to be replaced by the modified version of one of the dynamic portions and incorporating the modified version of one of the dynamic portions into the transmitted page displayed on the client responsive to the modification list; and a server comprising:

a server transceiver in communication with the client, the server transceiver transmitting the page and a plurality of dynamic portions included in the transmitted page to the client for display; and a partial page regenerator in communication with the server transceiver and the external page code source, the partial page regenerator receiving from the external page code source page generation code that generates one of the plurality of dynamic portions included in the page and executing an associated code fragment of the code to modify the one of the plurality of dynamic portions included in the page.

14. The system of claim 13 wherein the display alterer of the client receives additional code instructing the client regarding interpretation of the modification list.

15. The system of claim 13 wherein the client further comprises a storage buffer in communication with the display alterer, the storage buffer storing a first portion of the transmitted page displayed on the client for use in updating the transmitted page.

* * * * *